(12) United States Patent
Ueno et al.

(10) Patent No.: US 10,423,458 B2
(45) Date of Patent: Sep. 24, 2019

(54) PARALLEL PROCESSING SYSTEM, METHOD, AND STORAGE MEDIUM

(71) Applicant: FUJITSU LIMITED, Kawasaki-shi, Kanagawa (JP)

(72) Inventors: Tsutomu Ueno, Numazu (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 314 days.

(21) Appl. No.: 15/611,819

(22) Filed: Jun. 2, 2017

(65) Prior Publication Data

US 2018/0018201 A1    Jan. 18, 2018

(30) Foreign Application Priority Data

Jul. 13, 2016    (JP) .................................. 2016-138972

(51) Int. Cl.
*G06F 9/50* (2006.01)
*G06F 9/52* (2006.01)
*H04L 29/08* (2006.01)
*H04L 29/06* (2006.01)

(52) U.S. Cl.
CPC ............ *G06F 9/505* (2013.01); *G06F 9/5038* (2013.01); *G06F 9/52* (2013.01); *H04L 67/1038* (2013.01); *H04L 67/38* (2013.01); *G06F 9/5027* (2013.01); *H04L 67/10* (2013.01)

(58) Field of Classification Search
CPC ...................................................... G06F 9/505
See application file for complete search history.

(56) References Cited

U.S. PATENT DOCUMENTS

| 2003/0101272 | A1 | 5/2003 | Kaneko et al. | |
| 2008/0162664 | A1* | 7/2008 | Jegadeesan | G06F 9/505 709/217 |
| 2014/0317379 | A1* | 10/2014 | Miyazaki | G06F 9/5066 712/29 |

FOREIGN PATENT DOCUMENTS

| JP | 2003-162470 | 6/2003 |
| JP | 2005-190063 | 7/2005 |
| JP | 2012-73690 | 4/2012 |

* cited by examiner

*Primary Examiner* — Charlie Sun
(74) *Attorney, Agent, or Firm* — Xsensus LLP

(57) ABSTRACT

A parallel processing system creates a list when determining a start and an end times of processings for nodes and one or more of the nodes used by the processings, the list indicating an order of executing the processings and a number and positions of nodes used by the processings on coordinate axes, nodes included in the nodes and adjacent to each other in coordinate axis directions on the coordinate axes being coupled to each other, identifies a number of unused nodes on the coordinate axes at a time when the execution of a processing ends before an end time of the processing, and determines, based on the number and the list, a processing, a start time of which is to be advanced, from the processings at a time when the execution of the one of the processings ends before the end time of the one of the processings.

15 Claims, 25 Drawing Sheets

PARALLEL PROCESSING SYSTEM, METHOD, AND STORAGE MEDIUM

CROSS-REFERENCE TO RELATED APPLICATION

This application is based upon and claims the benefit of priority of the prior Japanese Patent Application No. 2016-138972, filed on Jul. 13, 2016, the entire contents of which are incorporated herein by reference.

FIELD

The embodiments discussed herein are related to a parallel processing system, a method, and a storage medium.

BACKGROUND

In the past, there has been known a technology for coupling, as for individual nodes included in nodes each including a processor and a memory, nodes adjacent to each other in each of coordinate axis directions of respective coordinate axes. In addition, there has been known a technology for determining, as for a job to be executed by each one of nodes, an execution start time and an execution end time of the job and a node to execute the job.

As a related technology, there is a technology for automatically changing, in reserving distribution of pieces of distribution data, usable bands, distribution start times, and so forth of pieces of distribution data to be added or already reserved pieces of distribution data in accordance with the types of distribution methods for the pieces of distribution data, thereby adjusting distribution schedules, for example. In addition, there is a technology in which, in a case of an execution status of a schedule being different from a plan, based on an execution status of the schedule and data of a desired condition, a schedule that is an unexecuted and confirmed schedule and that is able to be changed to be advanced is searched for, thereby informing information related to the schedule. In addition, there is a technology for searching, based on scheduling information including resource amounts and allocated time periods of jobs, for a free time period in which a resource amount of a job to newly serve as a scheduling target is able to be scheduled and that is less than an expected execution time period, thereby scheduling the job in the free time period.

As examples of the related art, Japanese Laid-open Patent Publication No. 2003-162470, Japanese Laid-open Patent Publication No. 2005-190063, and Japanese Laid-open Patent Publication No. 2012-73690 are known.

SUMMARY

According to an aspect of the invention, a parallel processing system includes a memory and a processor coupled to the memory. The processor is configured to: create a list when determining an execution start time and an execution end time of each of a plurality of processings for a plurality of nodes in the parallel processing system and one or more of the plurality of nodes used by each of the plurality of processings, the list storing information indicating an order of executing each of the plurality of processings and a number and positions with regard to nodes used by each of the plurality of processings on each of a plurality of coordinate axes, the plurality of nodes each including a processor and a memory, nodes included in the plurality of nodes and adjacent to each other in each of coordinate axis directions on the each of the plurality of coordinate axes being coupled to each other, identify a number of unused nodes on each of the plurality of coordinate axes at a time when the execution of one of the plurality of processings ends before an execution end time of the one of the plurality of processings by referring to the list before execution of the one of the plurality of processings ends, and determine, based on the identified number of unused nodes on each of the plurality of coordinate axes and the list, a processing, an execution start time of which is to be advanced, from the plurality of processings at a time when the execution of the one of the plurality of processings ends before the execution end time of the one of the plurality of processings.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

According to the related art, in a case of execution of a job ends before an execution end time of the job, a time taken to determine, from among jobs waiting to be executed, a job the execution start time of which is to be advanced may be increased with an increase in the number of nodes.

On one aspect, the present embodiment reduces a time taken to determine a job the execution start time of which is to be advanced, at a time of ending execution of a job before an execution end time of the job.

Hereinafter, disclosed embodiments of a parallel processing device, a job management method, and a job management program will be described in detail with reference to drawings.

Figure 1:
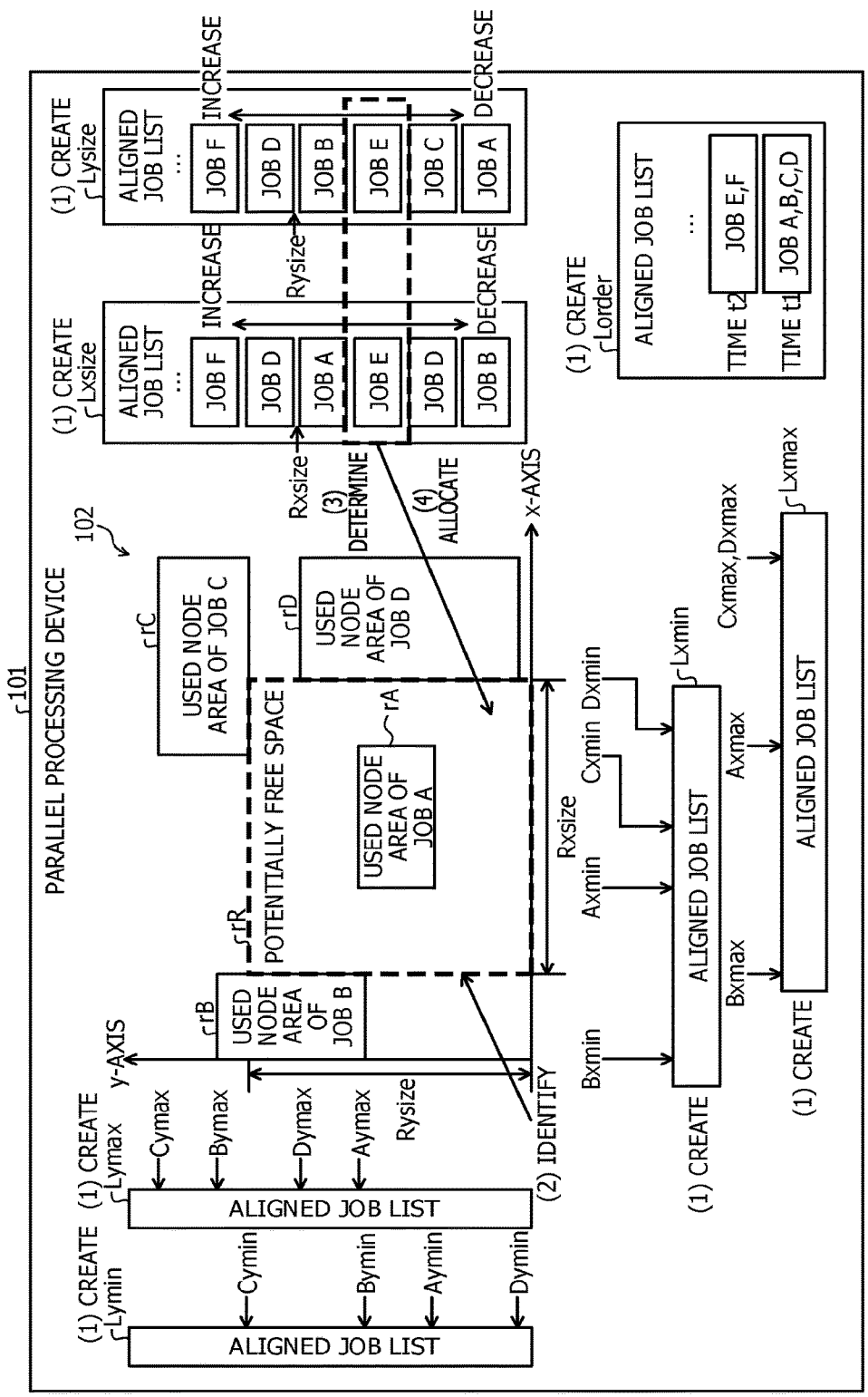
FIG. 1 illustrates an example of an operation of a parallel processing device according to the present embodiment.

FIG. 1 illustrates an example of an operation of a parallel processing device 101 according to the present embodiment. The parallel processing device 101 is a computer that schedules execution start times and execution end times of jobs and allocations of computational resources. The parallel processing device 101 performs scheduling of allocating, as a computational resource, one of nodes each including a processor and a memory, for example. In the following explanation, a node that includes a processor and a memory and to which a job is allocated is called a "calculation node". In addition, the execution start time and the execution end time are collectively called a "scheduled execution time period"

Here, the term "job" represents a unit of processing, viewed by a user. As a concept similar to the job, there are a process that is an execution unit of a program and that has a unique memory space, a thread that is an execution unit of a program and that shares a memory space with another thread belonging to a same process, and so forth. Accordingly, the parallel processing device 101 may allocate computational resources to threads or processes as jobs. Here, the term "job" means a job such as, for example, processing for scientific computation. In addition, the parallel processing device 101 is a computer used in a high performance computing (HPC) field, for example.

The parallel processing device 101 may be one of calculation nodes or may be another device coupled to the calculation nodes. In the description of FIG. 1, it is assumed that the parallel processing device 101 is the other device coupled to the calculation nodes.

In addition, as for the calculation nodes, calculation nodes adjacent to each other in each of coordinate axis directions of respective coordinate axes are coupled to each other. In addition, calculation nodes are coupled to each other, thereby forming a mesh-shaped network or a torus-shaped network, which has coordinate axes. In addition, calculation node groups reserved for execution in a predetermined time zone determined by a request from a user form submeshes or subtori, which do not overlap with each other within a network, in many cases. The submeshes or the subtori are formed, thereby enabling communication interference to be avoided, the communication interference being caused by different jobs simultaneously using a same network path.

While, here, it is desirable that individual coordinate axes included in the above-mentioned coordinate axes are orthogonal to one another, the individual coordinate axes may obliquely intersect with each other. In addition, in the following explanation, in a case where the formed network has a mesh shape, the network is regarded as embedded in a generic dimensional Euclidean space, and an expression of an n-dimensional rectangular parallelepiped or a simple expression of a rectangular parallelepiped is used in place of being called a mesh. In a case where the formed network is a torus, a job arrangement in a case of being regarded as a mesh is regarded as repeated at a link destination of wrap around, thereby associating a submesh or a subtorus with a generic dimensional rectangular parallelepiped.

Here, processing for allocating submeshes within a network, which do not overlap with each other, to respective jobs is regarded as processing for cutting subsets out of a rectangular parallelepiped so that the subsets are rectangular parallelepipeds having no intersection with one another, or processing for stuffing, into a rectangular parallelepiped area, rectangular parallelepipeds having no intersection with one another. In addition, in general this processing is known as an n-dimensional packing problem, and it is known that calculation for achieving optimization is a so-called non-deterministic polynomial (NP) hard problem, in which a calculation time rapidly increases with an increase in the size of a set of resources serving as targets.

In addition, the parallel processing device 101 performs not only scheduling for currently free resources but also scheduling including a reserved execution start time in the future. Accordingly, an execution start time and an execution end time of a job, determined by the scheduling, are times in the future. Based not only on a node resource amount requested by the job but also on the scheduled execution time period of the job, the parallel processing device 101 reserves calculation node resources and a time zone, which are used by the job, for example. In this regard, however, the scheduled execution time period of the job is usually specified by a user who inputs the job or an administrator of the parallel processing device 101 and is specified by being estimated to be longer than an actual execution time period of the job, in many cases. Therefore, the job ends earlier than the scheduled execution time period of the job, in many cases. In this way, in order to effectively utilize resources that become free due to the job that ends ahead of schedule, it is conceivable that a start time of a job the execution of which is reserved and that waits to be executed is advanced, thereby staring the execution.

However, in a case where execution of a job ends before an execution end time of the job, a time taken to determine, from among jobs waiting to be executed, a job the execution start time of which is to be advanced turns out to be increased with an increase in the number of nodes. If the time taken to determine a job to be advanced is lengthened, there is a possibility that resources supposed to be able to be normally used for advancing an execution time become unavailable, due to the shortage of a free time period. In this way, it is desirable that a job the execution start time of which is able to be advanced based on early ending of a job is shortened compared with a searching time period of a solution to a packing problem in usual scheduling and an increase in a CPU time of a scheduler itself, associated with an advance preparation, is suppressed.

Therefore, in the present embodiment, a list in which the number of nodes and positions thereof on each of coordinate axes used by a job at a time of determining a schedule are stored is created. Furthermore, in the present embodiment, the number of unused nodes on each of the coordinate axes at a time of ending the execution of the job is preliminarily identified. For this reason, in the present embodiment, there will be presented a method for obtaining a job able to be advanced, at high speed at a time of ending a job.

An example of an operation of the parallel processing device 101 will be described by using FIG. 1. In an example of FIG. 1, it is assumed that calculation nodes form, as n-dimensional rectangular parallelepipeds, two-dimensional mesh-shaped networks each having an x-coordinate axis and a y-coordinate axis. Furthermore, in FIG. 1, it is assumed that, as individual jobs included in the jobs, scheduling of respective jobs A to F is performed. In addition, it is assumed that, as a result of the scheduling, the jobs A to D are scheduled to be executed at a time t1 serving as a time in the future and the jobs E and F are scheduled to be executed at a time t2 later than the time t1.

As illustrated by (1) in FIG. 1, at a time of scheduling the jobs A to F, the parallel processing device 101 creates a list in which information indicating an order of executing the individual jobs and lists in which the number of nodes used by each of the jobs on each of the coordinate axes and positions of the nodes are stored. Here, the created lists each have a data structure for narrowing down, at high speed, jobs to be advanced, and information for identifying jobs is stored therein. Hereinafter, the created lists are called "aligned job lists".

In FIG. 1, calculation nodes to be used by the jobs A to D scheduled to be executed at t1 serving as a time in the future are as illustrated by a graph 102. As illustrated by the graph 102, the calculation nodes used by the jobs A to D generate areas. In an (x, y) space, areas indicated by the calculation nodes used by the jobs A to D are called "used node areas of jobs". While not illustrated in FIG. 1, calculation nodes used by the jobs E and F are illustrated in the same way as in the graph 102. The number of calculation nodes of a job on the x-coordinate axis corresponds to a width of the job on the x-axis, and positions of calculation nodes of the job on the x-coordinate axis correspond to x-coordinates of the job.

The parallel processing device 101 stores, in an aligned job list Lxsize storing therein the numbers of nodes of jobs on the x-coordinate axis, the numbers of calculation nodes of the jobs A to F on the x-coordinate axis, thereby creating the aligned job list Lxsize. In the same way, the parallel processing device 101 stores, in an aligned job list Lysize storing therein the numbers of nodes of jobs on the y-coordinate axis, the numbers of calculation nodes of the jobs A to F on the y-coordinate axis, thereby creating the aligned job list Lysize. Here, as for each of elements of the aligned job lists Lxsize and Lysize illustrated in FIG. 1, it is assumed that a job having a smaller value is located lower and a job having a larger value is located higher.

In the same way, the parallel processing device 101 stores, as positions of nodes of jobs on the x-coordinate axis, values of minimum x-coordinates of the respective jobs A to F, thereby creating an aligned job list Lxmin. In the aligned job list Lxmin, the minimum x-coordinate Bxmin of the job B, the minimum x-coordinate Axmin of the job A, the minimum x-coordinate Cxmin of the job C, and the minimum x-coordinate Dxmin of the job D are registered in this order, for example. Furthermore, while not illustrated in FIG. 1, the minimum x-coordinate of the job E and the minimum x-coordinate of the job F are registered at adequate positions within the aligned job list Lxmin. In the same way, the parallel processing device 101 creates an aligned job list Lxmax in which values of maximum x-coordinates of the respective jobs A to F are stored. In the same way, the parallel processing device 101 creates an aligned job list Lymin, in which values of minimum y-coordinates of the respective jobs A to F are stored, and an aligned job list Lymax, in which values of maximum y-coordinates of the respective jobs A to F are stored. In addition, the parallel processing device 101 creates an aligned job list Lorder in which information indicating an order of executing the jobs A to F is stored. In the aligned job list Lorder, the order of executing the jobs A to F may be stored, and values indicating times at which the respective jobs A to F are to be executed may be stored therein, for example.

Next, the parallel processing device 101 references the aligned job lists L, thereby identifying the number of unused nodes on each of the coordinate axes at a time of ending the execution of the job A before the execution end time of the job A. Here, positions of unused nodes on each of the coordinate axes at a time of ending the execution of the job A correspond to a space rR indicated by a thick dashed line on the graph 102, for example. Hereinafter, the number of unused nodes on each of the coordinate axes at a time of ending the execution of a job is called a "potentially free space". While the number of unused nodes on each of the coordinate axes only has to be included in the potentially free space, information of the positions of unused nodes on each of the coordinate axes may be included therein. It is desirable that the potentially free space has large an area as possible. In addition, a timing of identifying the potentially free space only has to be at any time earlier than ending of execution of a job. Accordingly, at a time of ending scheduling of a job or at a time of starting execution of a job, the parallel processing device 101 identifies the potentially free space of the job, for example. In addition, the parallel processing device 101 may identify the potentially free space of a job out of the jobs A to F or may identify the potentially free spaces of all jobs. For a job preliminarily understood not to end ahead of schedule, the parallel processing device 101 does not have to identify the potentially free space thereof, for example.

Here, an example of identifying the potentially free space rR of the job A by referencing the aligned job lists L is illustrated. The parallel processing device 101 references the aligned job list Lxmin, thereby obtaining the job C as an element subsequent to the job A, for example. Here, at a time t0, the minimum y-coordinate to the maximum y-coordinate of the job A and the minimum y-coordinate to the maximum y-coordinate of the job C do not overlap with each other. Accordingly, the job D is further obtained as a subsequent element. At the time t0, the minimum y-coordinate to the maximum y-coordinate of the job A and the minimum y-coordinate to the maximum y-coordinate of the job D partially overlap with each other. Accordingly, the processing device 101 identifies the maximum x-coordinate of the potentially free space as the minimum x-coordinate of the job D. In this way, the parallel processing device 101 identifies the potentially free space. A more specific method for identifying the potentially free space will be described in FIG. 9 to FIG. 11.

In the example of FIG. 1, as illustrated by (2) in FIG. 1, the parallel processing device 101 references the aligned job lists L before ending of the execution of the job A, thereby identifying the potentially free space rR, for example. In the example of FIG. 1, it is assumed that the number of unused nodes on the x-coordinate axis, in other words, the x-size of the potentially free space rR is Rxsize, and it is assumed that the number of unused nodes on the y-coordinate axis, in other words, the y-size of the potentially free space rR is Rysize.

Next, in a case where, before an execution end time of one of jobs, a potentially free space of the corresponding one of the jobs being identified, execution of the corresponding one of the jobs ends, the parallel processing device 101 determines, based on the potentially free space of the corresponding one of the jobs and the aligned job lists L, a job the execution start time of which is to be advanced. In the example of FIG. 1, it is assumed that, after a current time becomes the time t1 and execution of the jobs A to D is started, execution of one of the jobs ends before the execution end time of the job A. It is assumed that, at this point of time, a current time does not reach the time t2. Accordingly, jobs the execution of which is not started at this point of time are the jobs E and F the execution of which is to be started at the time t2, as illustrated by the aligned job list Lorder. Therefore, the parallel processing device 101 determines, from among the jobs E and F waiting to be executed, a job the execution start time of which is to be advanced.

By referencing the aligned job lists Lxsize and Lysize, the parallel processing device 101 searches for a job that has an x-size less than or equal to Rxsize of the potentially free space rR of the job A and that has a y-size less than or equal to Rysize of the potentially free space rR of the job A. In the example of FIG. 1, as illustrated by (3) in FIG. 1, from among the jobs E and F, the parallel processing device 101 determines, as a job the execution start time of which is to be advanced, the job E that has an x-size less than or equal to Rxsize and that has a y-size less than or equal to Rysize. In addition, as illustrated by (4) in FIG. 1, the parallel processing device 101 allocates the job E to the potentially free space rR.

In this way, since preliminarily identifying the potentially free space, the parallel processing device 101 is able to determine, at high speed, a job the execution start time of which is to be advanced. In addition, while, in the example of FIG. 1, the aligned job lists Lxsize and Lysize are used, a hash table in which the numbers of nodes on the x-coordinate axis and the y-coordinate axis and a hash value to monotonically increase are registered as keys may be used, thereby identifying a candidate for a job the execution start time of which is to be advanced. This method will be illustrated in FIG. 12 to FIG. 15. Next, an example of applying the parallel processing device 101 to a parallel processing system 200 is illustrated in FIG. 2.

Figure 2:
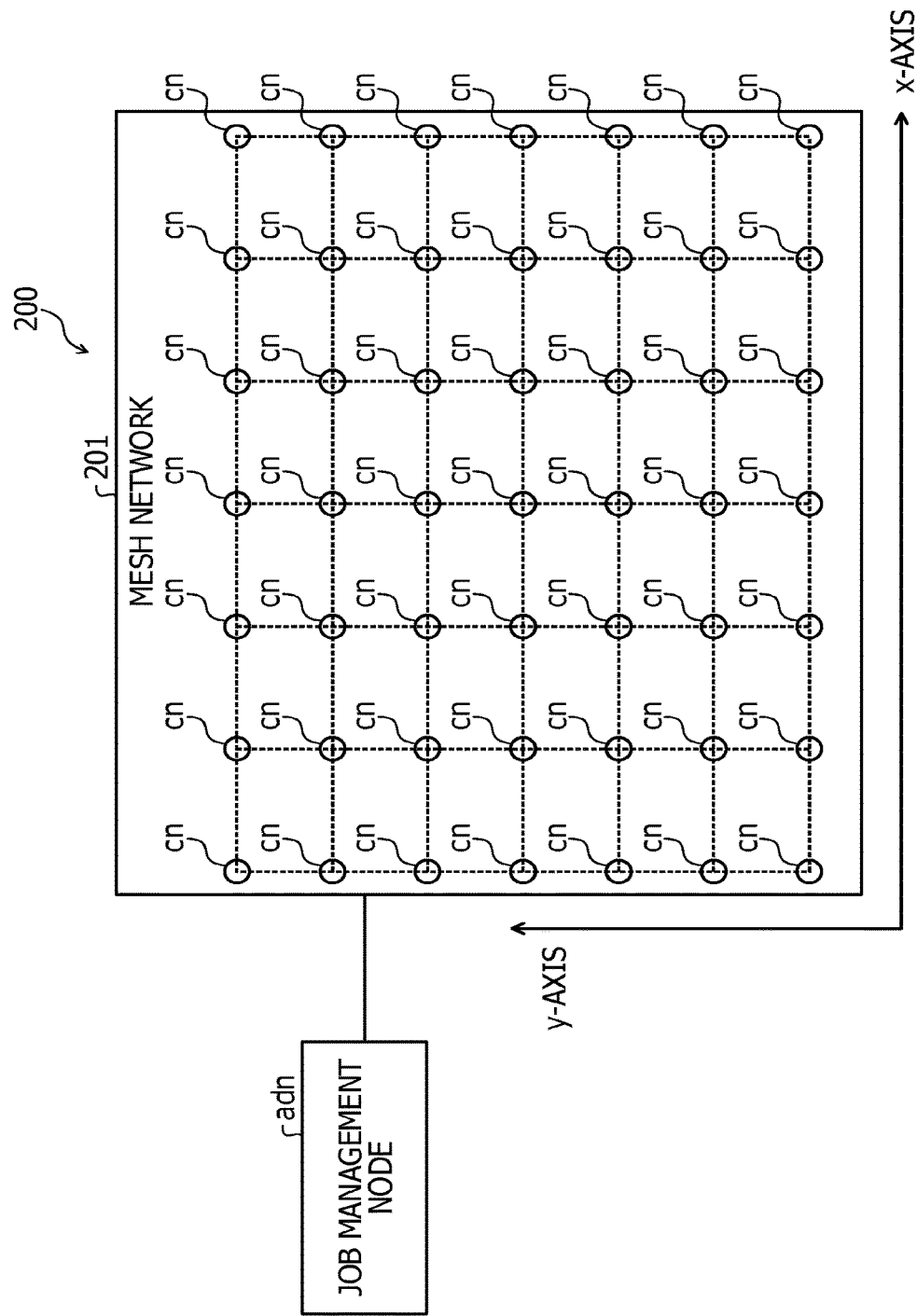
FIG. 2 illustrates an example of a configuration of a parallel processing system.

FIG. 2 illustrates an example of a configuration of a parallel processing system. The parallel processing system 200 includes a job management node adn and individual calculation nodes cn included in calculation nodes. Here, the job management node adn corresponds to the parallel processing device 101 illustrated in FIG. 1. The individual calculation nodes cn form a network having an n-dimensional mesh structure or torus structure in which "n" is greater than or equal to two. In the present embodiment, it is assumed that a two-dimensional mesh network 201 satisfying n=2 is formed. In this case, the position of each of the calculation nodes within the parallel processing system 200 is indicated by (x, y) coordinates as illustrated in FIG. 2.

The job management node adn schedules scheduled execution time periods of jobs and resources to be allocated thereto. The job management node adn mainly manages computational resources. The job management node adn allocates, to a job the execution of which is requested, a pair of a calculation node resource and a time zone in which the nodes are available, as execution reservation information, for example. In addition, when a scheduled execution start time of a job arrives, the job management node adn requests allocated calculation nodes to execute the job.

The calculation nodes cn each mainly control execution of a job. As for a job requested by the job management node adn, the calculation nodes cn each control monitoring, ending, and so forth of starting of execution of the job and an execution state thereof, for example. In this regard, however, in response to a processing request from a portion executed by the job management node adn, the calculation nodes cn take charge of part of management of computational resources in some cases.

Next, an example of a hardware configuration of a node collectively meant by the job management node adn and the calculation nodes cn.

Example of Hardware Configuration of Node

Figure 3:
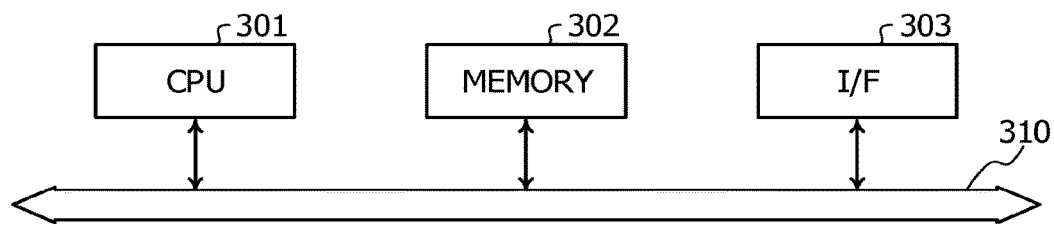
FIG. 3 illustrates an example of a hardware configuration of a node.

FIG. 3 illustrates an example of a hardware configuration of a node. The node includes a CPU 301, a memory 302, and an interface (I/F) 303. In addition, the individual configuration units are coupled to one another via a bus 310.

Here, the CPU 301 is a control device to manage control of the entire node. The memory 302 is a storage device that includes a read only memory (ROM), a random access memory (RAM), a flash ROM, and so forth, for example. The flash ROM stores therein programs such as an operating system (OS) and firmware, the ROM stores therein application programs, and the RAM is used as a work area of the CPU 301, for example. The programs stored in the memory 302 are loaded into the CPU 301, thereby causing the CPU 301 to perform coded processing.

The I/F 303 is a device to control inputting and outputting of data from and to another node. The I/F 303 is coupled to a computer network between nodes, called Interconnect, for example.

Figure 4:
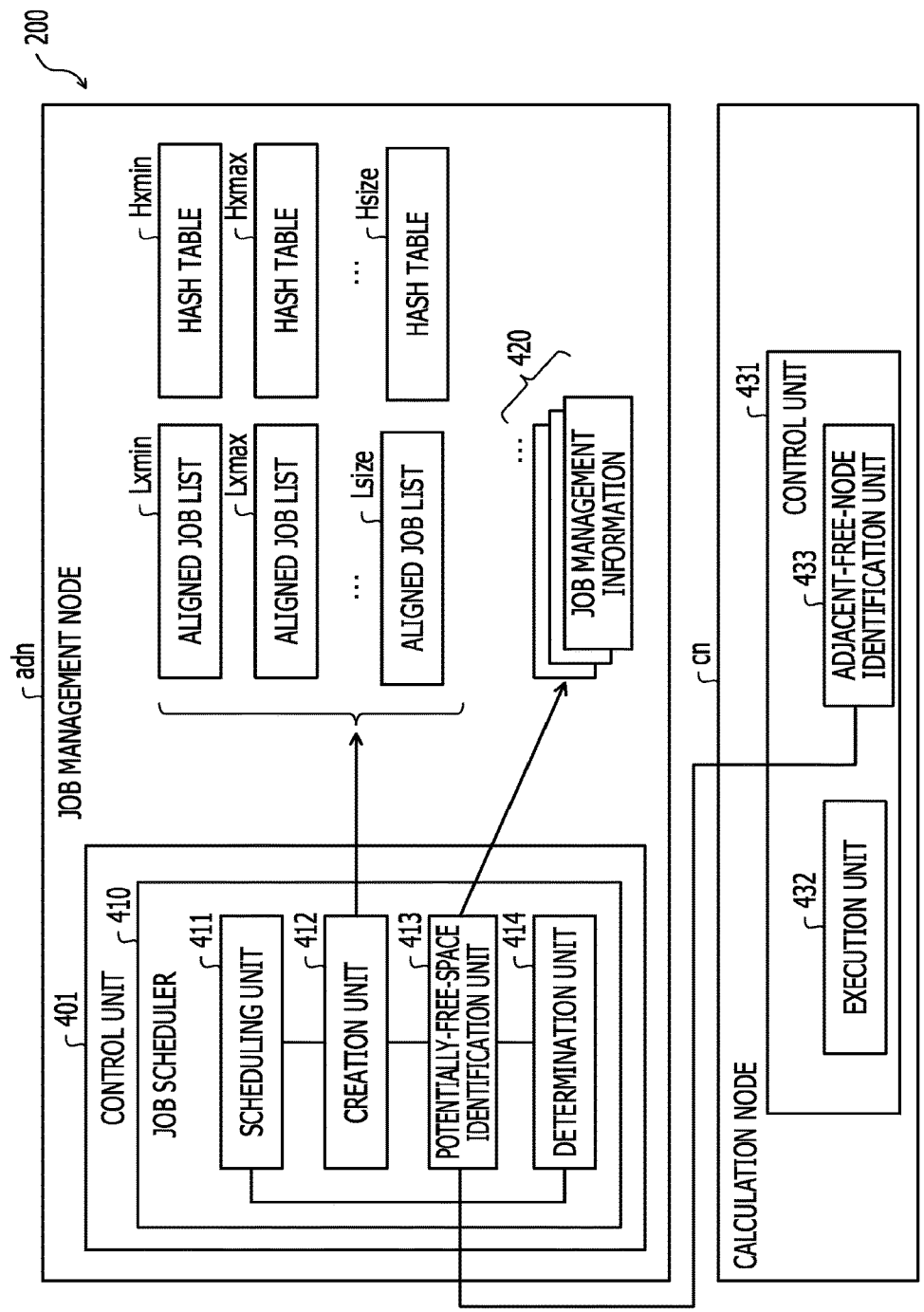
FIG. 4 illustrates an example of a functional configuration of the parallel processing system.

FIG. 4 illustrates an example of a functional configuration of the parallel processing system. The parallel processing device 101 includes a control unit 401. The control unit 401 includes a job scheduler 410. In addition, the job scheduler 410 includes a scheduling unit 411, a creation unit 412, a potentially-free-space identification unit 413, and a determination unit 414. The CPU 301 executes programs stored in a storage device, thereby causing the job scheduler 410 to realize functions of the respective units. The storage device is the memory 302 illustrated in FIG. 3, or the like, for example. In addition, processing results of the respective units are stored in the memory 302, registers of the CPU 301, cache memories of the CPU 301, and so forth.

In addition, the job scheduler 410 is able to access the aligned job lists Lxmin, Lxmax, . . . , and Lsize, hash tables Hxmin, Hxmax, . . . , and Lsize, and pieces of job management information 420. The aligned job lists L, the hash tables H, and the pieces of job management information 420 are stored in a storage device such as the memory 302. The pieces of job management information 420 exist for respective jobs. A relationship between the aligned job lists L, the hash tables H, and the pieces of job management information 420 will be illustrated in FIG. 13.

In addition, the calculation nodes cn each include a control unit 431. In addition, the control unit 431 includes an execution unit 432 and an adjacent-free-node identification unit 433. The CPU 301 executes programs stored in a storage device, thereby causing the control unit 431 to realize functions of the respective units. The storage device is the memory 302 illustrated in FIG. 3, or the like, for example. In addition, processing results of the respective units are stored in the memory 302, registers of the CPU 301, cache memories of the CPU 301, and so forth.

Here, in the present embodiment, one of a first embodiment to a third embodiment is adopted with roughly classified. First, a function of the first embodiment will be described. Detailed descriptions of the first embodiment will be illustrated in FIG. 6 to FIG. 15.

The scheduling unit 411 allocates a scheduled execution time period and calculation nodes of each job included in jobs.

Figure 13:
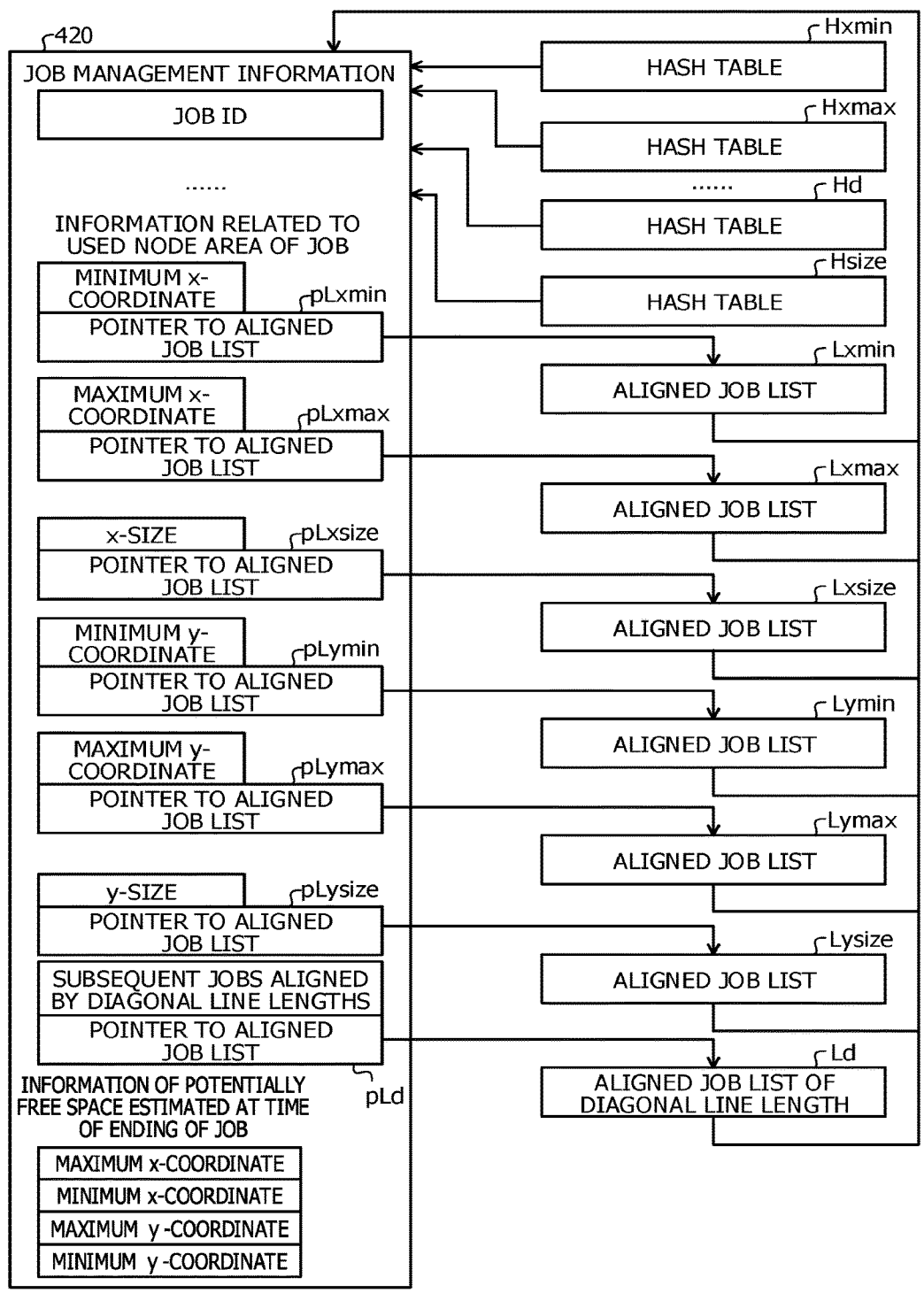
FIG. 13 illustrates an example of job management information.

In a case where the scheduling unit 411 determines a schedule, the creation unit 412 creates the aligned job lists L. An example of a listing of the aligned job lists L is illustrated in FIG. 13.

Before ending of execution of one of the jobs, the potentially-free-space identification unit 413 references the aligned job lists L created by the creation unit 412, thereby identifying a potentially free space of the corresponding one of the jobs.

In a case where execution of the corresponding one of the jobs ends before an execution end time of the corresponding one of the jobs, the determination unit 414 determines, based on the potentially free space identified by the potentially-free-space identification unit 413 and the aligned job lists L, a job the execution start time of which is to be advanced.

The execution unit 432 included in a corresponding one of the calculation nodes cn executes the job in accordance with an instruction from the job scheduler 410.

Figure 12:
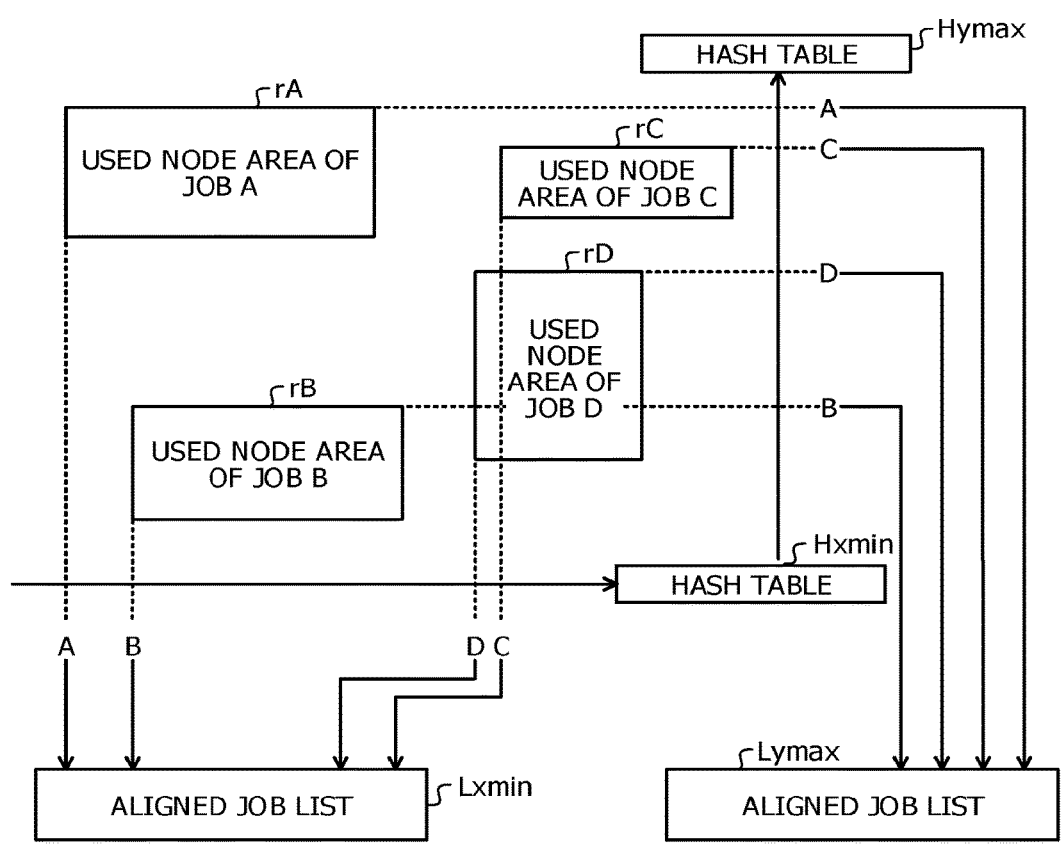
FIG. 12 illustrates an example of visualizing information stored in hash tables.

In addition, the creation unit 412 creates the hash table Hsize to store therein a hash value output by inputting the number of nodes that are located on each of the coordinate axes and that are used by each of the jobs, to a hash function in which an output value monotonically increases with an increase in an input value. A specific example of the hash function is illustrated in FIG. 12. Next, in a case where execution of the corresponding one of the jobs ends before the execution end time of the corresponding one of the jobs, the determination unit 414 inputs, to the hash function, the number of the calculation nodes cn on each of the coordinate axes of the potentially free space identified by the potentially-free-space identification unit 413, thereby calculating a hash value. In addition, based on a result of a comparison between the calculated hash value and a hash value stored in the hash table Hsize, the determination unit 414 may determine, from among jobs, a job the execution start time of which is to be advanced.

Next, a function of the second embodiment will be described. The second embodiment is an effective method in a case where the size of the mesh network 201 is large, and is a method for dividing the mesh network 201, thereby narrowing down candidate-to-be-advanced jobs to jobs within a divided group or jobs of an adjacent group. Detailed descriptions of the second embodiment will be illustrated in FIG. 16 to FIG. 18.

In a case where the scheduling unit 411 determines a schedule, the creation unit 412 classifies each of jobs into one of groups, based on an order of executing individual jobs and used node areas of the respective jobs. Here, the groups are each called a "section". Next, for each of the classified sections, the creation unit 412 creates the aligned job lists L related to individual jobs classified into the corresponding one of the sections. Accordingly, the creation unit 412 turns out to create the aligned job lists L so that the aligned job lists L correspond to the number of the sections.

Next, before ending of execution of one of the jobs, the potentially-free-space identification unit 413 references the aligned job lists L of a section to which the corresponding one of the jobs belongs, thereby identifying a potentially free space. In addition, in a case where execution of the corresponding one of the jobs ends before an execution end time of the corresponding one of the jobs, the determination unit 414 determines, based on the identified potentially free space and the aligned job lists L of the above-mentioned section, a job the execution start time of which is to be advanced, from among jobs belonging to the above-mentioned section.

Next, a function of the third embodiment will be described. The third embodiment is a method for causing the calculation nodes cn to execute part of processing performed by the job scheduler 410, thereby promoting load distribution. Detailed descriptions of the third embodiment will be illustrated in FIG. 19 to FIG. 25.

At a time of starting execution of one of the jobs, the potentially-free-space identification unit 413 references the created lists and transmits a request to execute adjacent-free-node identification processing, to a node that is adjacent to the used node area of the corresponding one of the jobs and that is not used by the corresponding one of the jobs. Here, the adjacent-free-node identification processing is processing for notifying a processing request source of the number of nodes used by none of jobs in each of directions perpendicular to the individual coordinate axes.

Next, the adjacent-free-node identification unit 433 in the calculation node cn that receives the request to execute the adjacent-free-node identification processing executes the adjacent-free-node identification processing. A result of the execution is transmitted to the job management node adn serving as the processing request source.

In addition, it is assumed that the job management node adn receives the number of nodes used by none of the jobs, from the node not used by the corresponding one of the jobs. In this case, the potentially-free-space identification unit 413 identifies the potentially free space of the corresponding one of the jobs, based on the number of nodes used by none of the jobs.

Figure 5:
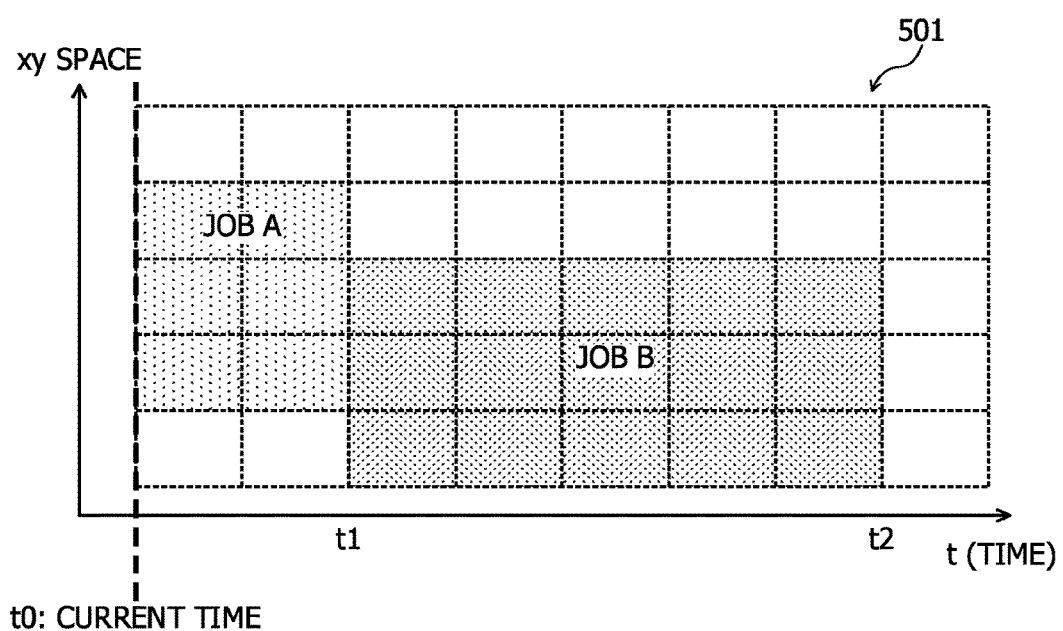
FIG. 5 illustrates an example of an image of a schedule table.

FIG. 5 illustrates an example of an image of a schedule table. FIG. 5 illustrates an example of an image of a schedule table managed by the job scheduler 410. A graph 501 illustrated in FIG. 5 illustrates scheduled execution time periods of jobs and allocated resources of the jobs. A horizontal axis of the graph 501 indicates a time. In order to facilitate illustration, a vertical axis of the graph 501 is obtained by projecting the (x, y) space of the mesh network 201 onto an x-axis or a y-axis.

The graph 501 indicates that the lightly shaded job A is allocated as an active job scheduled to be ended at the time t1, for example. Here, since an allocated time zone of the job A includes the current time t0, the job A is currently executed. In addition, the graph 501 indicates that the heavily shaded job B is allocated as a job scheduled to be executed in a scheduled execution time period between the time t1 and the time t2.

In addition, areas allocated to jobs in the schedule table, for example, the lightly shaded area and the heavily shaded within the graph 501 correspond to the used node areas illustrated in FIG. 1. Next, a relationship between used nodes used by jobs and the aligned job lists L will be described by using FIG. 6 to FIG. 8.

First Embodiment

In the first embodiment, there will be described an example of creating the aligned job lists L to be used in a method for obtaining, as a block of resources considered to become an empty area, as large an area as possible in a case where one of jobs ends ahead of schedule.

Figure 6:
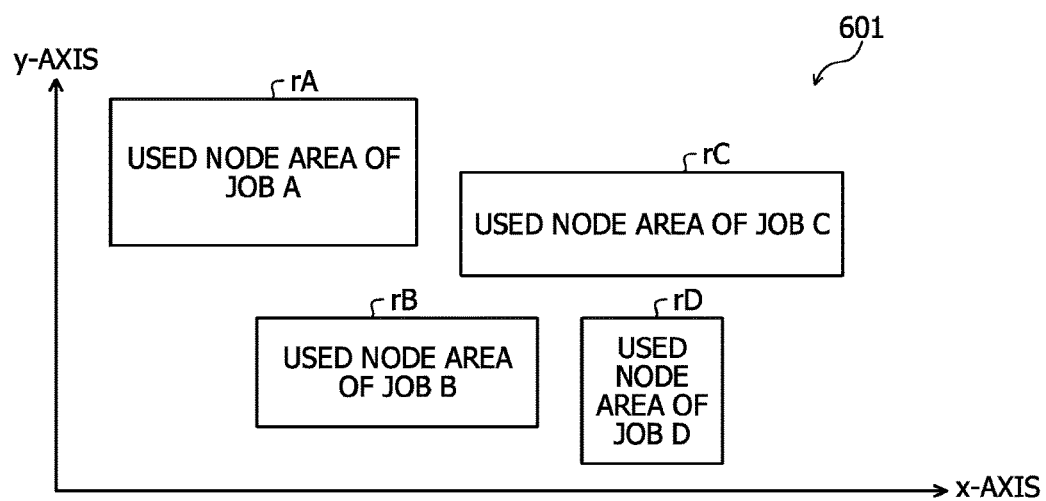
FIG. 6 is an explanatory diagram (part one) illustrating a relationship between used nodes and aligned job lists.
Figure 7:
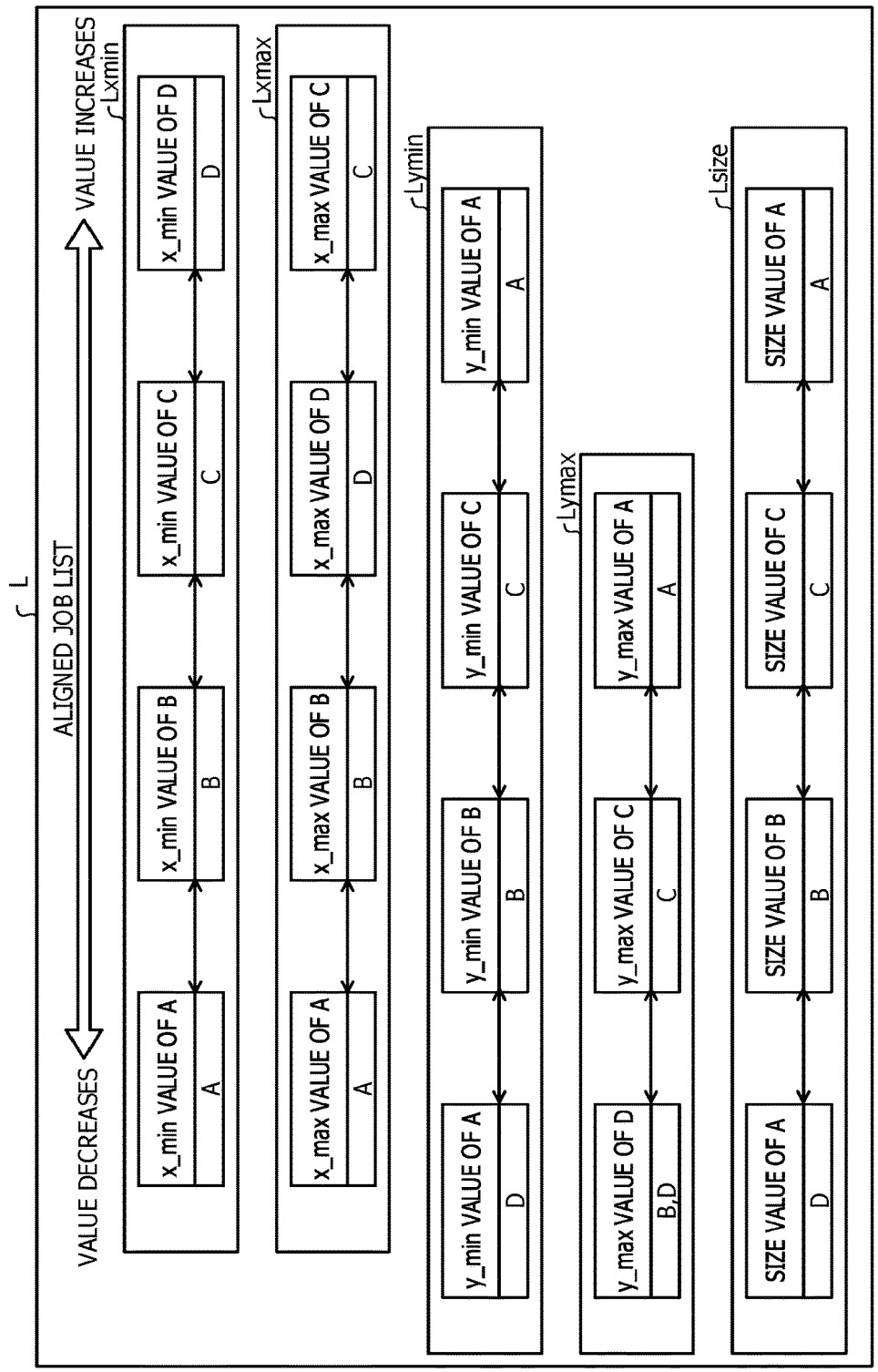
FIG. 7 is an explanatory diagram (part two) illustrating a relationship between the used nodes and the aligned job lists.

FIG. 6 is an explanatory diagram (part one) illustrating a relationship between used nodes and the aligned job lists L. In addition, FIG. 7 is an explanatory diagram (part two) illustrating a relationship between the used nodes and the aligned job lists L. A graph 601 illustrated in FIG. 6 illustrates used node areas rA to rD of the respective jobs A to D, as examples of the aligned job lists L illustrated in FIG. 6 to FIG. 8. In addition, FIG. 7 illustrates the five aligned job lists L. The five aligned job lists L illustrated in FIG. 7 each indicate that a value decreases with drawing nigh to a left side and a value increases with drawing nigh to a right side.

Regarding an example of FIG. 6, the aligned job list Lxmin obtained by aligning the used node areas rA to rD of the respective jobs A to D with respect to the minimum x-coordinates thereof includes elements of the jobs A, B, C, and D in ascending order of value, as illustrated in FIG. 7. In the same way, the aligned job list Lxmax aligned with respect to the maximum x-coordinates includes elements of the jobs A, B, D, and C in ascending order of value, as illustrated in FIG. 7. In the same way, the aligned job list Lymin aligned with respect to the minimum y-coordinates includes elements of the jobs D, B, C, and A in ascending order of value, as illustrated in FIG. 7.

In the same way, the aligned job list Lymax aligned with respect to the maximum y-coordinates includes elements of the jobs B and D, the job C, and the job A in ascending order of value, as illustrated in FIG. 7. In an example of FIG. 6, since the maximum y-coordinates of the respective used node areas rB and rD are equal to each other, the job B and the job D are stored in the same element, regarding Lymax. In the same way, as illustrated in FIG. 7, the aligned job list Lsize aligned with respect to the sizes of the used node areas includes elements of the jobs D, B, C, and A in ascending order of value. In addition, the individual elements of the aligned job lists L illustrated in FIG. 7 are pointed by management data managed for each of the jobs. A state of pointing the individual elements of the aligned job lists L will be described by using FIG. 8.

Figure 8:
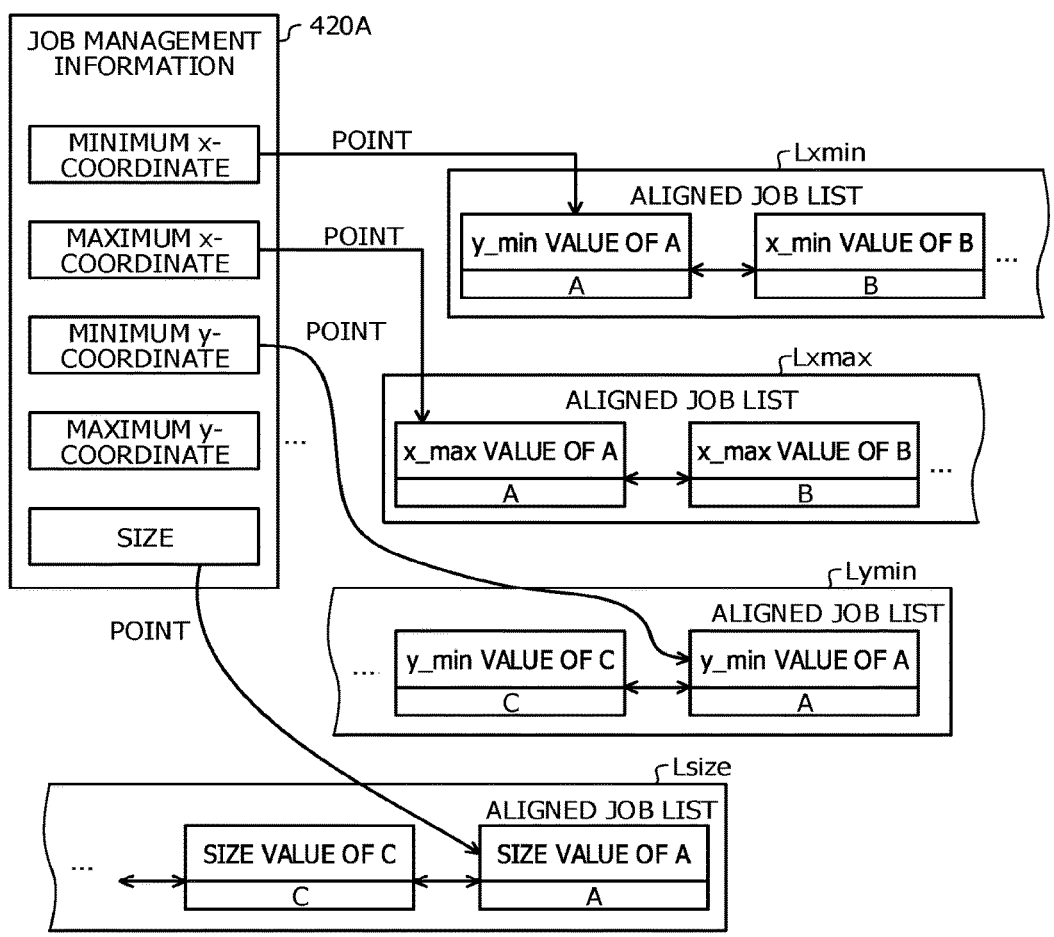
FIG. 8 is an explanatory diagram (part three) illustrating a relationship between the used nodes and the aligned job lists.

FIG. 8 is an explanatory diagram (part three) illustrating a relationship between the used nodes and the aligned job lists L. A job management information 420A of the job A includes, as attribute parameters of the job A, a minimum x-coordinate, a maximum x-coordinate, a minimum y-coordinate, a maximum y-coordinate, and sizes. In addition, the minimum x-coordinate within the job management information 420A points the element A of the aligned job list Lxmin. In the same way, the maximum x-coordinate within the job management information 420A points the element A of the aligned job list Lxmax. In the same way, the minimum y-coordinate within the job management information 420A points the element A of the aligned job list Lymax. In the same way, the size within the job management information 420A points the element A of the aligned job list Lsize.

In addition, while including, as the attribute parameters, information related to an arrangement (x, y), the job management information 420A illustrated in FIG. 8 may further include information related to a scheduled execution time period. A more detailed description of the job management information 420 will be illustrated in FIG. 13.

How to Obtain Potentially Free Space

Figure 9:
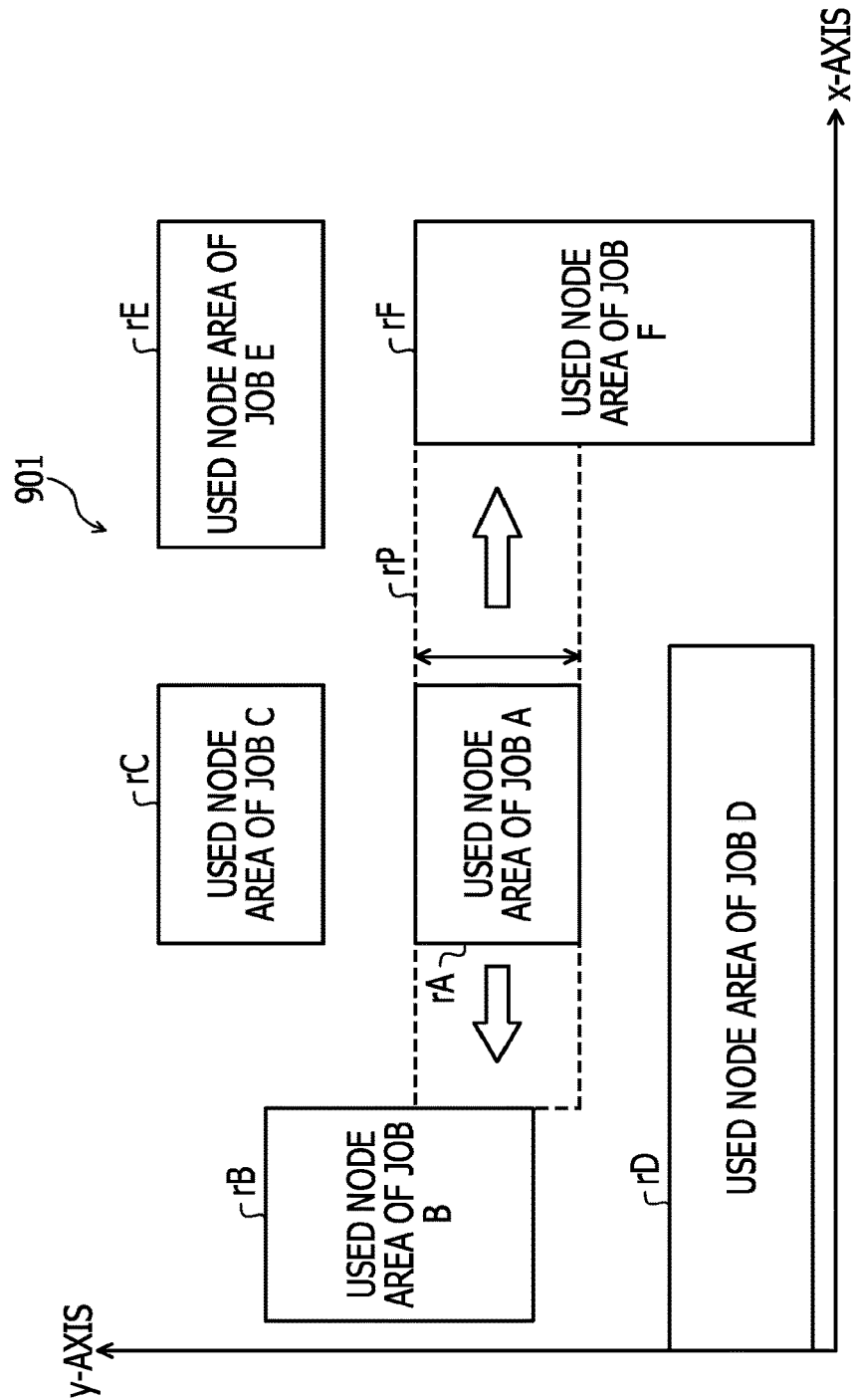
FIG. 9 illustrates an example of a potentially free space determined by obtaining an adjacent job in a narrow sense in an x-axis direction.
Figure 10:
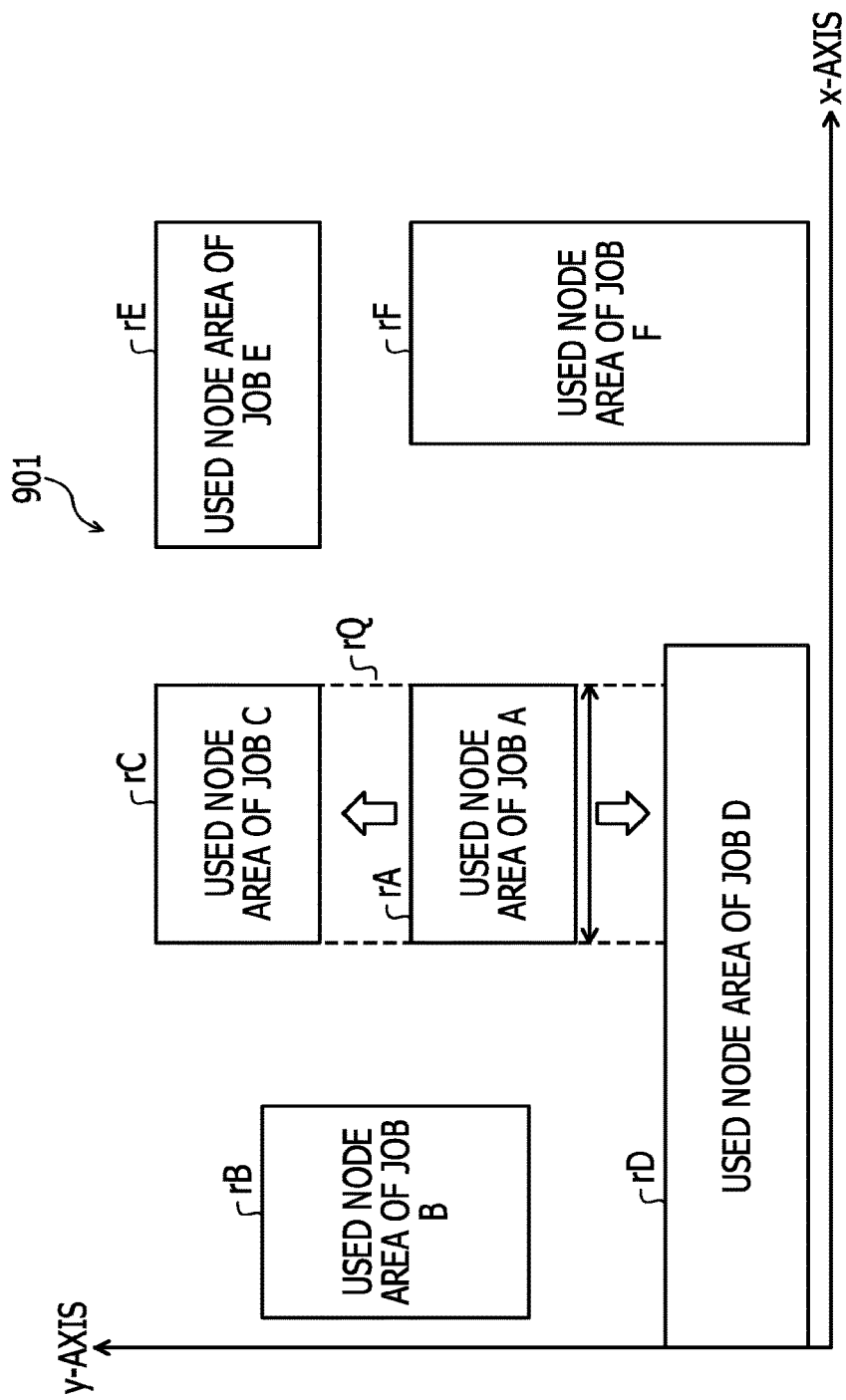
FIG. 10 illustrates an example of a potentially free space determined by obtaining an adjacent job in a narrow sense in a y-axis direction.
Figure 11:
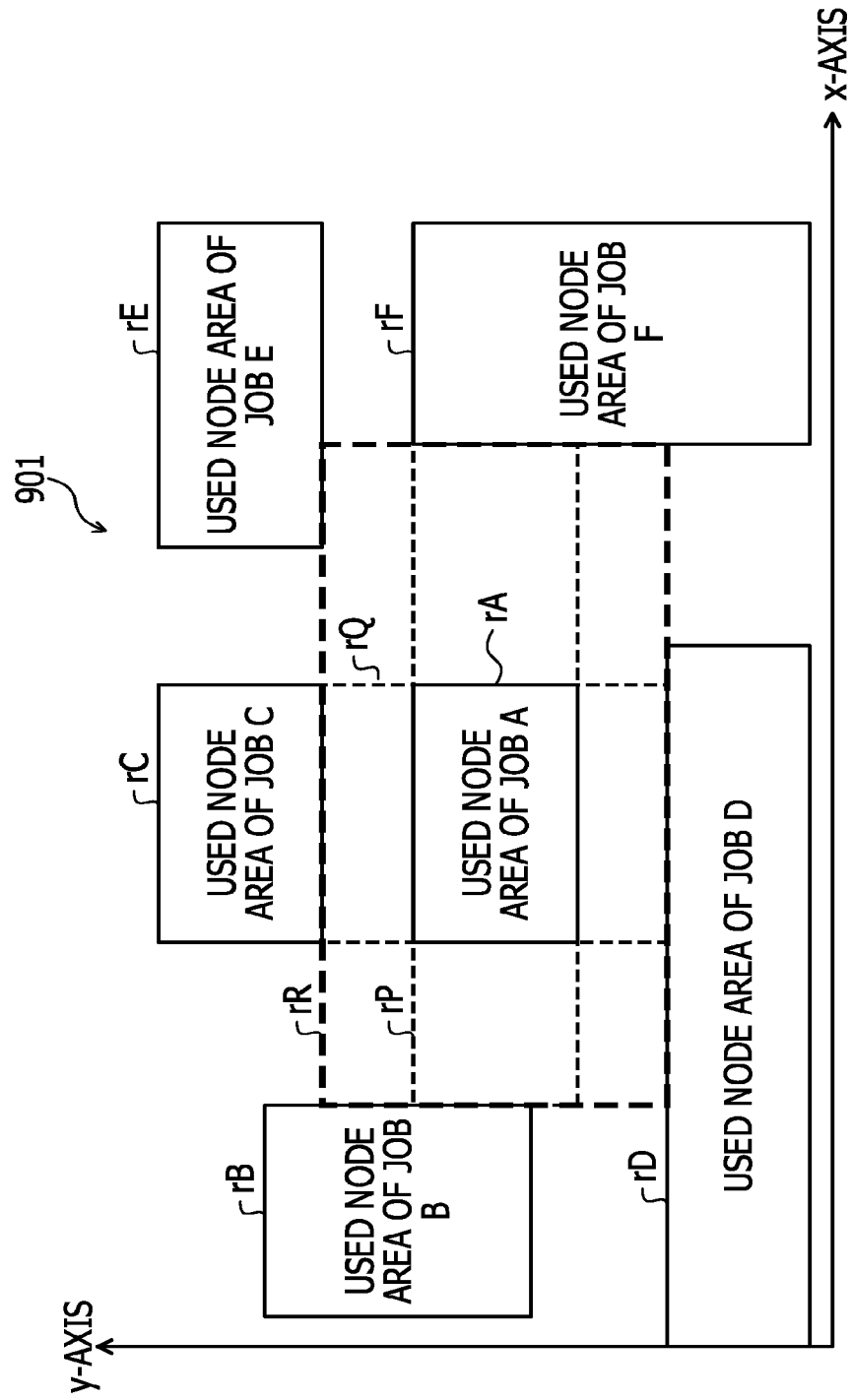
FIG. 11 illustrates an example of a potentially free space determined by obtaining an adjacent job in a wide sense.

Next, by using FIG. 9 to FIG. 11, there will be described a method for obtaining, as a block of resources considered to become an empty area, as large an area as possible in a case where one of jobs ends ahead of schedule. In the descriptions of FIG. 9 to FIG. 11, it is assumed that the job A out of the jobs A to F ends ahead of schedule. As this method for obtaining as large an area as possible, a potentially free space is identified in the first embodiment. The job scheduler 410 uses the obtained potentially free space, as hint information for advancing a start time of a job waiting to be executed. The reason why used as the hint information is that, regarding a job that waits to be executed and that has a size included in the potentially free space, at least the start time thereof is able to be advanced.

As an example of the potentially free space, the job scheduler 410 may identify a potentially free space determined by obtaining an adjacent job in a narrow sense or may identify a potentially free space determined by obtaining an adjacent job in a wide sense. Examples of obtaining an adjacent job in a narrow sense will be described by using FIG. 9 and FIG. 10. Examples of obtaining an adjacent job in a narrow sense include an example of obtaining an adjacent job in a narrow sense in an x-axis direction and an example of obtaining an adjacent job in a narrow sense in a y-axis direction. The example of obtaining an adjacent job in a narrow sense in the x-axis direction will be described by using FIG. 9.

FIG. 9 illustrates an example of a potentially free space determined by obtaining an adjacent job in a narrow sense in an x-axis direction. A graph 901 illustrated in FIG. 9 illustrates the used node areas rA to rF of the respective jobs A to F. As illustrated by the graph 901, there is an area P obtained, from the used node area rA, by widening the used node area rA in both a positive direction and a negative direction of the x-axis while changing none of a minimum y-coordinate and a maximum y-coordinate from those of the used node area rA. Such an area is called a "potentially free space determined by obtaining an adjacent job in a narrow sense in an x-axis direction". In a case where it is assumed that the potentially free space determined by obtaining an adjacent job in a narrow sense in the x-axis direction is rP, the job scheduler 410 obtains rP as follows.

Within a range of the minimum y-coordinate to the maximum y-coordinate of the job A, the job scheduler 410 searches for a job to be overlapped first at a time of elongating in the positive direction of the x-axis from the maximum x-coordinate of the job A and determines a minimum x-coordinate of the found job, as a maximum x-coordinate of rP. In an example of the graph 901, the maximum x-coordinate of rP is the minimum x-coordinate of the job F. The job scheduler 410 references the aligned job list Lxmin, thereby selecting an element located in a direction of increasing the value of the minimum x-coordinate from the job A, for example. In a case where a job of the selected element is not located in the range of the minimum y-coordinate to the maximum y-coordinate of the job A, the job scheduler 410 selects an element subsequent to the selected element and repeats the same processing. In addition, in a case where the job of the selected element is located in the range of the minimum y-coordinate to the maximum y-coordinate of the job A, the job of the selected element is a job to be overlapped first. Accordingly, in this a case, the job scheduler 410 determines the minimum x-coordinate of the selected element, as the maximum x-coordinate of rP.

In addition, by using the same method as that for the maximum x-coordinate of rP, the job scheduler 410 determines a minimum x-coordinate of rP. In addition, a maximum y-coordinate of rP becomes equal to a maximum y-coordinate of rA. In the same way, a minimum y-coordinate of rP becomes equal to a minimum y-coordinate of rA.

Next, an example of obtaining an adjacent job in a narrow sense in a y-axis direction will be described by using FIG. 10.

FIG. 10 illustrates an example of a potentially free space determined by obtaining an adjacent job in a narrow sense in a y-axis direction. By exchanging "x" with "y" with respect to the procedure performed in FIG. 9, the job scheduler 410 obtains a potentially free space determined by obtaining an adjacent job in a narrow sense in a y-axis direction.

In a case where it is assumed that the potentially free space determined by obtaining an adjacent job in a narrow sense in the y-axis direction is rQ, rQ is as illustrated in FIG. 10. A maximum y-coordinate of rQ becomes the minimum y-coordinate of the job C, and a minimum y-coordinate of rQ becomes the maximum y-coordinate of the job D, for example. A potentially free space determined by obtaining an adjacent job in a wide sense will be described by using FIG. 11.

FIG. 11 illustrates an example of a potentially free space determined by obtaining an adjacent job in a wide sense. Here, it is assumed that the potentially free space determined by obtaining an adjacent job in a wide sense is rR obtained as follows in a state in which rP and rQ described in FIG. 9 and FIG. 10, respectively, are obtained.

The job scheduler 410 widens rP in a positive direction and a negative direction of the y-axis, thereby obtaining an adjacent job in a narrow sense. Here, it is assumed that a maximum space that is obtained by widening rP in the positive direction and the negative direction of the y-axis and that does not overlap with an adjacent job is rP'. In the same way as the procedure illustrated in FIG. 9, the job scheduler 410 uses the aligned job lists L, thereby obtaining rP'. In addition, the job scheduler 410 widens rQ in the positive direction and the negative direction of the x-axis, thereby obtaining an adjacent job in a narrow sense. Here, it is assumed that a maximum space that is obtained by widening rQ in the positive direction and the negative direction of the x-axis and that does not overlap with an adjacent job is rQ'. In the same way as the procedure illustrated in FIG. 9, the job scheduler 410 uses the aligned job lists L, thereby obtaining rQ'. In addition, the job scheduler 410 defines, as rR, an intersection between rP' and rQ'.

In an example of FIG. 11, since rP'=rQ' is satisfied, rP'=rQ'=rR is satisfied. In the example of FIG. 1, rR is indicated by a thick dashed line.

How to Narrow Down Job Able to be Advanced

After identifying a potentially free space, the job scheduler 410 narrows down, among jobs scheduled to be executed, candidates for a job the start of which is to be advanced, by using the identified potentially free space as a search key. A job serving as a candidate is a job satisfying the following two conditions. The first condition is that a requested resource amount of the job has a size less than or equal to that of the potentially free space. Here, the requested resource amount of the job corresponds to resource amounts of the job in respective dimensions in the mesh network 201 and corresponds to an x-size and a y-size of the job in a case of two-dimensional mesh, for example. The second condition is that a scheduled execution time period of the job is less than or equal to (a scheduled execution end time of the job–a current time). Here, the scheduled execution end time is a time at which execution of the job originally scheduled by a user ends. In what follows, a method for using the aligned job lists L aligned by sizes of used node areas will be described.

Here, in a case of searching, within the aligned job lists L aligned by, for example, coordinates, sizes, and so forth of used node areas, for a job having a specific size, the searching is performed while tracing in order from a head or an end, and it takes time for processing to be performed. Therefore, in the present embodiment, the hash tables H corresponding to alignment keys of the aligned job lists L are used, thereby speeding up processing for identifying a job within the aligned job lists L. Next, information stored in the hash tables H will be described by using FIG. 12.

FIG. 12 illustrates an example of visualizing information stored in the hash tables H. FIG. 12 illustrates an example of the hash table Hxmin corresponding to the aligned job list Lxmin of minimum x-coordinates and an example of the hash table Hymax corresponding to the aligned job list Lymax of maximum y-coordinates.

In the hash table Hxmin, pointers to elements that are included in the aligned job list Lxmin and that correspond to keys are stored while defining the minimum x-coordinates as the keys. By using the minimum x-coordinate of the job rA as a key, the job scheduler 410 acquires a pointer to an element in which the job A of the aligned job list Lxmin is stored, for example. In this way, the job scheduler 410 is able to search for a corresponding job, without searching while tracing in order from a head or an end of the aligned job list Lxmin. A relationship between the hash table Hymax and the aligned job list Lymax is the same.

In addition, for a potentially free area of a job that ends ahead of schedule, a job having an area less than or equal to a size is searched for at a time of searching for a candidate job. Therefore, at a time of fixing other parameters, a hash value may be used as a search key, by using a hash function having a property of monotonically increasing with respect to sizes (x-size, y-size). Having this property causes a greater hash value to correspond to a greater space. Accordingly, a search range is restricted to a range in which hash values are less than or equal to a specific value. The above-mentioned hash function is one of the following functions, for example. In addition, functions illustrated as follows are examples at a time of adopting a 3-dimensional mesh or torus of (x, y, z).

As the first example of the hash function, a function of calculating an integer portion of a value obtained by multiplying a length of a diagonal line of a job by a given number is cited. The hash function in the first example is expressed by the following Expression (1), for example.

$$\text{Hash Value} = \lfloor \text{Given Number} * \sqrt{((x_{max}-x_{min})^2 + (y_{max}-y_{min})^2 + (z_{max}-z_{min})^2)} \rfloor \quad (1)$$

Here, "xmax", "xmin", "ymax", "ymin", "zmax", and "zmin" indicate a maximum x-coordinate, a minimum x-coordinate, a maximum y-coordinate, a minimum y-coordinate, a maximum x-coordinate, and a minimum z-coordinate of a job, respectively. In addition, $\lfloor a \rfloor$ indicates an integer portion of "a", in other words, a minimum integer not exceeding "a".

As the second example of the hash function, a function of calculating an integer portion of a value obtained by multiplying a geometric mean of sizes in all dimensions by a given number is cited. The hash function in the second example is expressed by the following Expression (2), for example.

$$\text{Hash Value} = \lfloor \text{Given Number} * ((x_{max}-x_{min})*(y_{max}-y_{min})*(z_{max}-z_{min}))^{(1/3)} \rfloor \quad (2)$$

As the third example of the hash function, a function of calculating an integer portion of a value obtained by multiplying a harmonic mean of sizes in all dimensions by a given number is cited. The hash function in the third example is expressed by the following Expression (3), for example.

$$\text{Hash Value} = |\text{Given Number} * (1/(1/(x\text{max}-x\text{min}) + 1/(y\text{max}-y\text{min}) + 1/(z\text{max}-z\text{min})))| \quad (3)$$

As the fourth example of the hash function, a function of calculating an integer portion of a value obtained by multiplying the logarithm of a cubic volume by a given number is cited. The hash function in the fourth example is expressed by the following Expression (4), for example.

$$\text{Hash Value} = |\text{Given Number} * \log((x\text{max}-x\text{min}) * (y\text{max}-y\text{min}) * (z\text{max}-z\text{min}))| \quad (4)$$

Here, the base of the logarithm in Expression (4) may be any value as long as the value is greater than "1" and monotonically increases. In addition, The reason why multiplying by a given number in each of Expressions (1) to (4) is that, by reflecting a difference between values after the decimal point, a different value is likely to be assigned in a case of a different shape, for example. In addition, in a case where the range of the hash value is great and the size of the hash table becomes too large, it is desirable that a hash value is obtained, as in Expression (4), by using a function such as a logarithmic function, which gradually increases, thereby narrowing the range.

FIG. 13 illustrates an example of the job management information 420. FIG. 13 illustrates a relationship between the job management information 420, the aligned job lists L, and the hash tables H. FIG. 13 illustrates the job management information 420 for one of jobs. In order to simplify an explanation, the job management information illustrated in FIG. 13 is an example of a case of being coupled by a two-dimensional network of (x, y). In addition to a job ID, the job management information 420 includes, as information related to a used node area of a job, information of a minimum x-coordinate, a maximum x-coordinate, an x-size, a minimum y-coordinate, a maximum y-coordinate, a y-size, and subsequent jobs aligned by diagonal line lengths.

Furthermore, the job management information 420 includes pointers p of aligned job lists, which correspond respective items of the minimum x-coordinate to the subsequent jobs aligned by diagonal line lengths. The job management information 420 includes a pointer pLymin to an aligned job list of minimum x-coordinates, which correspond to minimum x-coordinates, for example. In the same way, the job management information 420 includes pointers pLymax, pLysize, pLymin, pLymax, pLysize, and pLd of the aligned job lists L, which correspond to the maximum x-coordinate, the x-size, the minimum y-coordinate, the maximum y-coordinate, the y-size, and the diagonal line lengths, respectively. Here, a position pointed by each of the pointers is a position of an element of a corresponding one of jobs in the aligned job lists L. In this way, based on the job management information 420, it is possible to trace a position of one of jobs in the aligned job lists L. In addition, in an opposite manner, it is possible to trace the job management information 420 of each of jobs, based on the aligned job lists.

In addition, as illustrated in FIG. 13, the job management information 420 includes information of a potentially free space estimated at a time of ending of the job thereof. The job management information 420 includes a maximum x-coordinate, a minimum x-coordinate, a maximum y-coordinate, and a minimum y-coordinate of the potentially free space, for example.

In addition, the job management information 420 is associated with the hash table Hxmin of minimum x-coordinates, the hash table Hxmax of maximum x-coordinates, . . . , and the hash table Hd of diagonal line lengths. Furthermore, the job management information 420 is associated with the hash table Hsize of sizes, in which hash values calculated by one of the above-mentioned registered Expressions (1) to (4) are registered. In addition, the job scheduler 410 may create the aligned job list Lsize corresponding to the hash table Hsize.

Next, processing performed at a time of reserving, in other words, scheduling execution of the job A and processing performed thereafter at a time of ending of the job A in the first embodiment will be described by using FIG. 14 and FIG. 15 as flowcharts.

Figure 14:
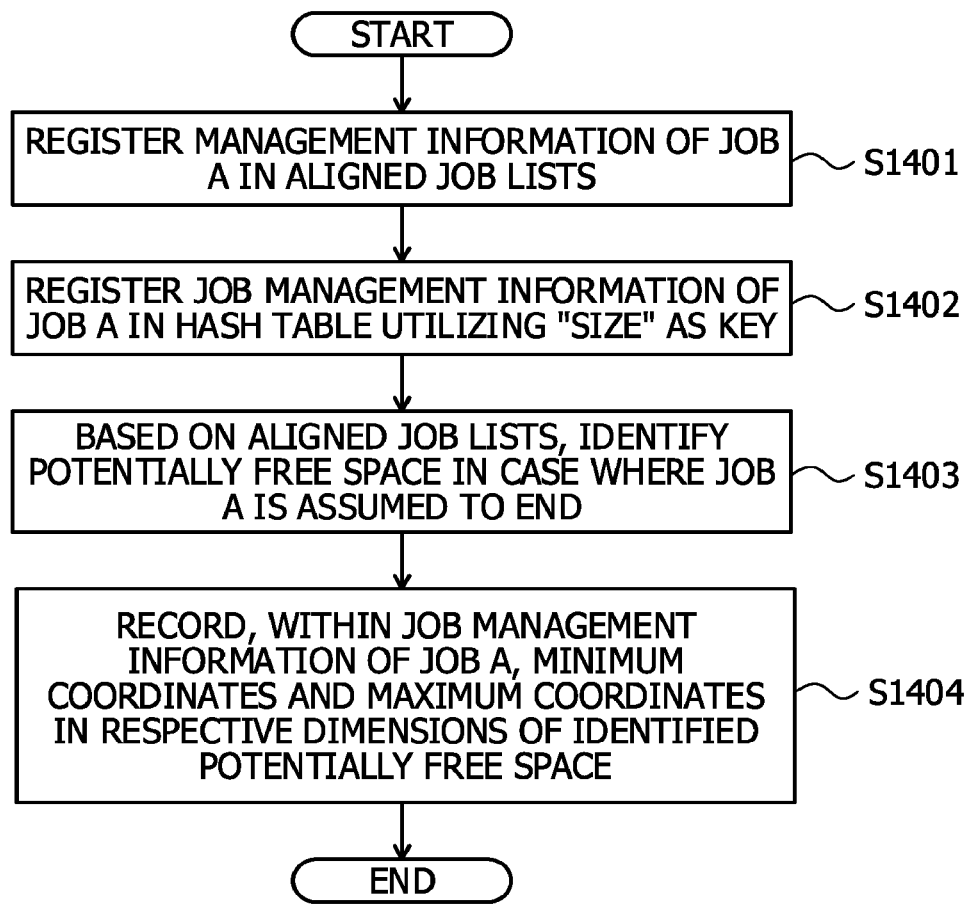
FIG. 14 is a flowchart illustrating an example of a processing procedure performed at a time of reserving execution of a job.

FIG. 14 is a flowchart illustrating an example of a processing procedure performed at a time of reserving execution of a job. Processing performed at a time of reserving execution of a job is processing performed by the job scheduler 410 after determination of scheduling of the job.

The job scheduler 410 registers the job management information 420 of the job A in the aligned job lists L (step S1401). Here, a timing of performing the processing illustrated in FIG. 14 is after determination of scheduling of the job A, and minimum coordinates, maximum coordinates, and sizes in respective dimensions of an allocated area of the job A are understood. Therefore, it is possible to insert the information of the job A into the aligned job lists L.

Next, the job scheduler 410 registers, in the hash table Hsize utilizing a "size" as a key, the job management information 420 of the job A (step S1402). Here, in a case where a size is equal and a kay conflicts, the job scheduler 410 sets, for the size, a list in which an element registered first is defined as the top thereof. In addition, in addition to the size, the job scheduler 410 may create different hash tables H in which sizes, minimum coordinates, and maximum coordinates in respective dimensions are defined as respective keys and may register therein the job A. In this case, in the processing operation in step S1401, the job scheduler 410 is able to swiftly obtain insertion positions in the aligned job lists L by using hash tables. Therefore, the processing operation in step S1401 is efficiently performed.

In addition, based on the aligned job lists L, the job scheduler 410 identifies a potentially free space in a case where the job A is assumed to end (step S1403). The potentially free space is identified by the method illustrated in FIG. 9 to FIG. 11, for example. The job A is designated as a starting point for the aligned job lists L related to minimum coordinates and maximum coordinates in respective dimensions, thereby tracing within the aligned job lists. Accordingly, the potentially free space is obtained, for example.

Next, the job scheduler 410 records, within the job management information 420A of the job A, minimum coordinates and maximum coordinates in respective dimensions of the identified potentially free space (step S1404). After the processing operation in step S1404 finishes, the job scheduler 410 terminates the processing performed at a time of reserving execution of the job.

Figure 15:
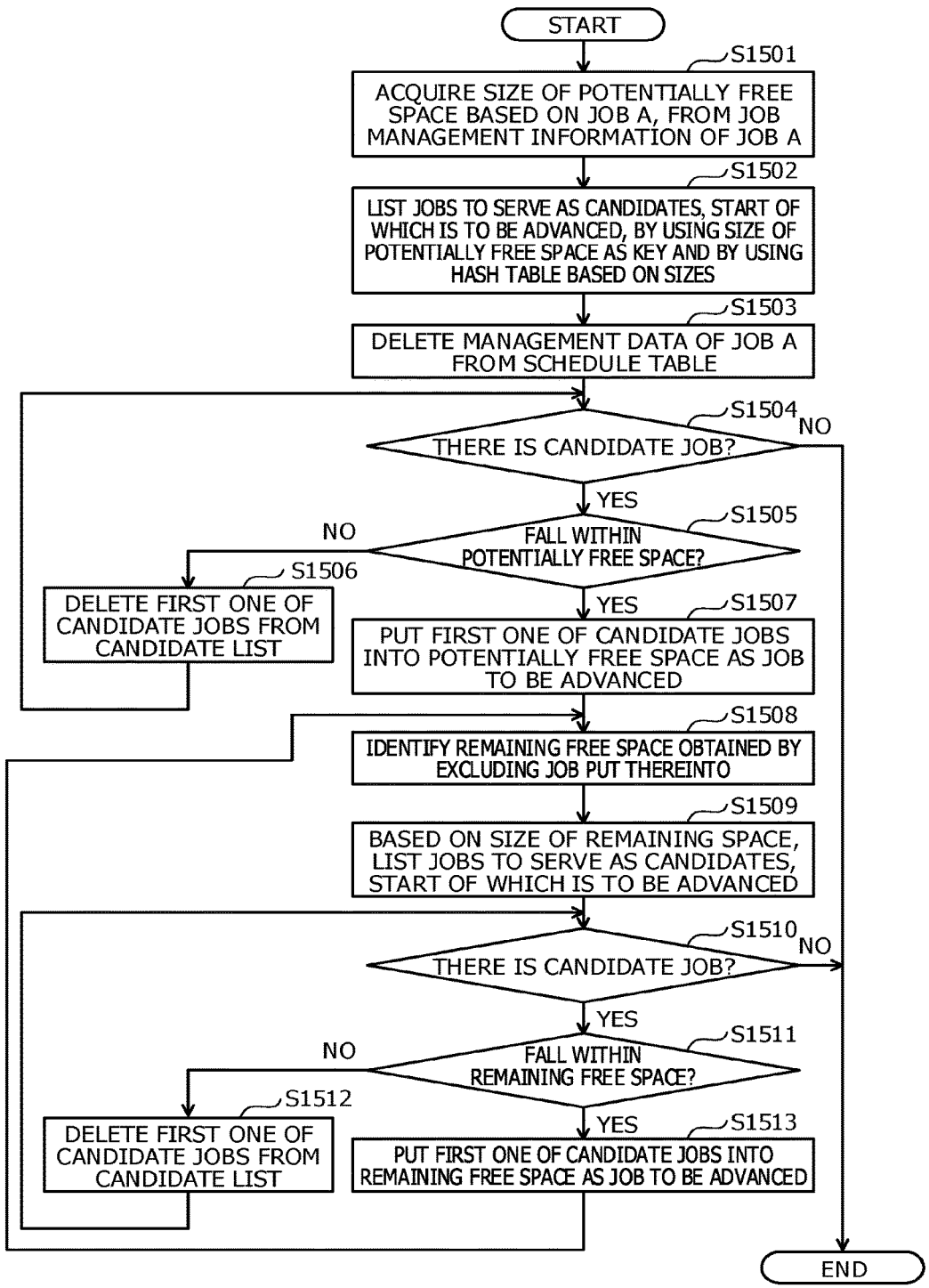
FIG. 15 is a flowchart illustrating an example of a processing procedure performed at a time of ending execution of a job.

FIG. 15 is a flowchart illustrating an example of a processing procedure performed at a time of ending execution of a job. Processing performed at a time of ending execution of a job is processing performed in a case where the job A ends ahead of a scheduled execution end time of the job.

The job scheduler 410 acquires the size of a potentially free space based on the job A, from the job management information 420A of the job A (step S1501). The information of the potentially free space is information preliminarily obtained by the processing operation in step S1404.

Next, the job scheduler 410 lists jobs to serve as candidates the start of which is to be advanced, by using the size of the potentially free space as a key and by using the hash table Hsize based on sizes (step S1502). Here, the hash table Hsize is already created in the processing operation in step S1402. By using the size of the potentially free space as a key, the job scheduler 410 looks up the hash table Hsize, thereby acquiring the management information of a job having the relevant size, as a candidate-to-be-advanced job. In addition, in a case where there is no job having the relevant size, the job scheduler 410 may search within the hash table Hsize in a direction of reducing a size, thereby acquiring as a candidate-to-be-advanced job. In addition, in order to acquire candidate jobs the number of which corresponds to a predetermined threshold value, the job scheduler 410 may search within the hash table Hsize a number of times corresponding to the predetermined threshold value. In addition, in the processing operation in step S1502, the job scheduler 410 confirms whether a scheduled execution time period of a candidate job searched based on the hash table Hsize is less than or equal to (a scheduled execution end time of a job–a current time). In a case where the scheduled execution time period of the candidate job is greater than (the scheduled execution end time of the job–the current time), the job scheduler 410 removes the candidate job from candidates.

In addition, the job scheduler 410 deletes the management data of the job A from the schedule table (step S1503). Here, the job scheduler 410 implements deleting of pieces of information of the job A from the aligned job lists L and the hash tables.

Next, the job scheduler 410 determines whether or not there is a candidate job (step S1504). In a case where there is a candidate job (step S1504: Yes), the job scheduler 410 determines whether or not a first one of candidate jobs falls within the potentially free space (step S1505). In a case where the first one of candidate jobs does not fall within the potentially free space (step S1505: No), the job scheduler 410 deletes the first one of the candidate jobs from a candidate list (step S1506). In addition, the job scheduler 410 makes a transition to the processing operation in step S1504.

On the other hand, in a case where the first one of candidate jobs falls within the potentially free space (step S1505: Yes), the job scheduler 410 puts the first one of candidate jobs into the potentially free space as a job to be advanced (step S1507). A case of putting, into the potentially free space, the job the start of which is to be advanced means that a schedule of the job is updated. Therefore, the job scheduler 410 performs the processing performed at a time of reserving execution of a job and illustrated in FIG. 14.

After putting, into the potentially free space, the job to be advanced, the job scheduler 410 identifies a remaining free space obtained by excluding the job put thereinto (step S1508). The job scheduler 410 identifies a remaining free space obtained by excluding, from a rectangular parallelepiped indicating the potentially free space, a rectangular parallelepiped indicating the used node area of the job to be advanced, for example. Here, the processing operation in step S1508 is performed after a processing operation in step S1513, in some cases. In this case, the job scheduler 410 identifies a remaining free space obtained by further excluding, from the rectangular parallelepiped indicating the remaining free space, the rectangular parallelepiped indicating the used node area of the job to be advanced.

Next, based on the size of the remaining space, the job scheduler 410 lists jobs to serve as candidates the start of which is to be advanced (step S1509). The processing operation in step S1509 is the same processing operation as the processing operation in step S1502.

In addition, the job scheduler 410 determines whether or not there is a candidate job (step S1510). In a case where there is a candidate job (step S1510: Yes), the job scheduler 410 determines whether or not the first one of candidate jobs falls within the remaining free space (step S1511). In a case where the first one of candidate jobs does not fall within the remaining free space (step S1511: No), the job scheduler 410 deletes the first one of the candidate jobs from the candidate list (step S1512). In addition, the job scheduler 410 makes a transition to the processing operation in step S1510.

On the other hand, in a case where the first one of candidate jobs falls within the remaining free space (step S1511: Yes), the job scheduler 410 puts the first one of candidate jobs into the remaining free space as a job to be advanced (step S1513). In the same way as the processing operation in step S1507, a case of putting, into the free space, the job the start of which is to be advanced means that a schedule of the job is updated. Therefore, the job scheduler 410 performs the processing performed at a time of reserving execution of a job and illustrated in FIG. 14. In addition, the job scheduler 410 makes a transition to the processing operation in step S1508.

In addition, in a case where there is no candidate job (step S1504: No or step S1510: No), the job scheduler 410 terminates the processing performed at a time of ending execution of a job.

Second Embodiment

In the first embodiment, jobs are registered in the aligned job lists L. However, in a case where the size of the entire network of the calculation nodes cn is large, it is conceivable that the whole thereof is divided into sections, which do not intersect with one another, and aligned job lists are held for each of the sections. For this reason, the numbers of elements of the aligned job lists L are reduced. Hereinafter, jobs belonging to sections located within near distance of a potentially free space are defined as targets, thereby narrowing down candidates. An example of determining jobs at a time of dividing into sections will be described by using FIG. 16 to FIG. 18.

Figure 16:
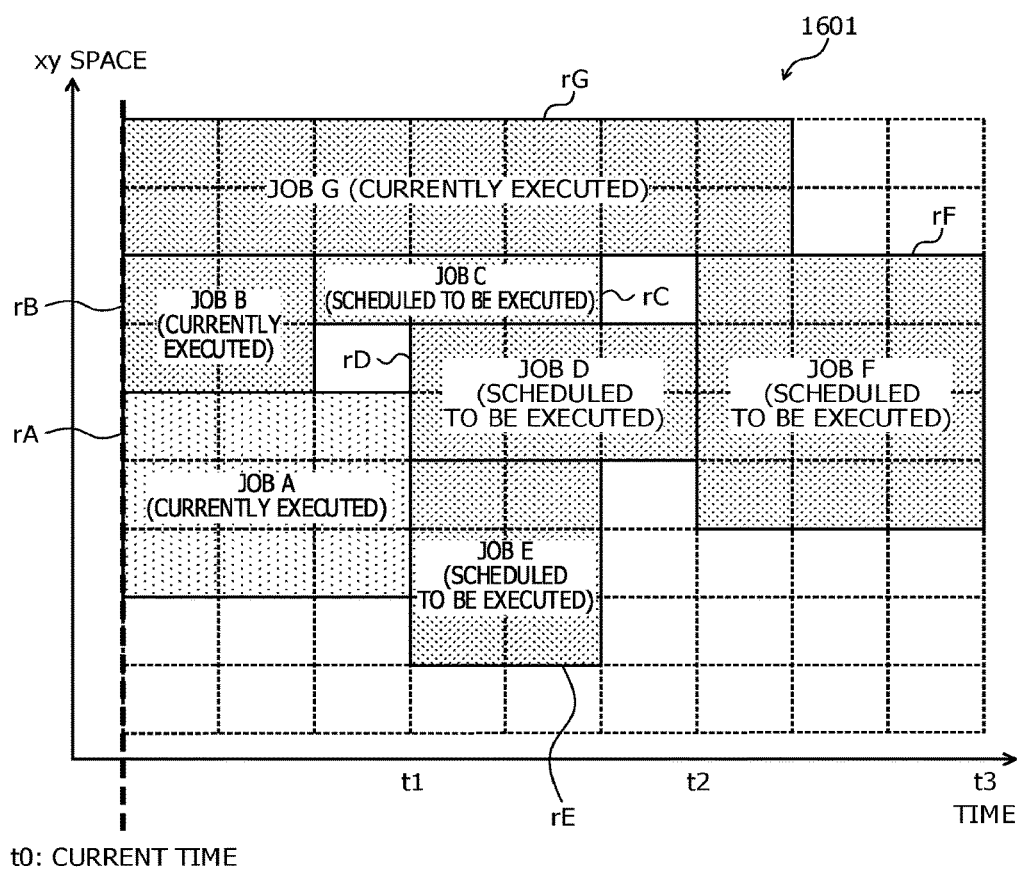
FIGS. 16, 17, and 18 illustrate an example of determining candidate-to-be-advanced jobs.
Figure 17:
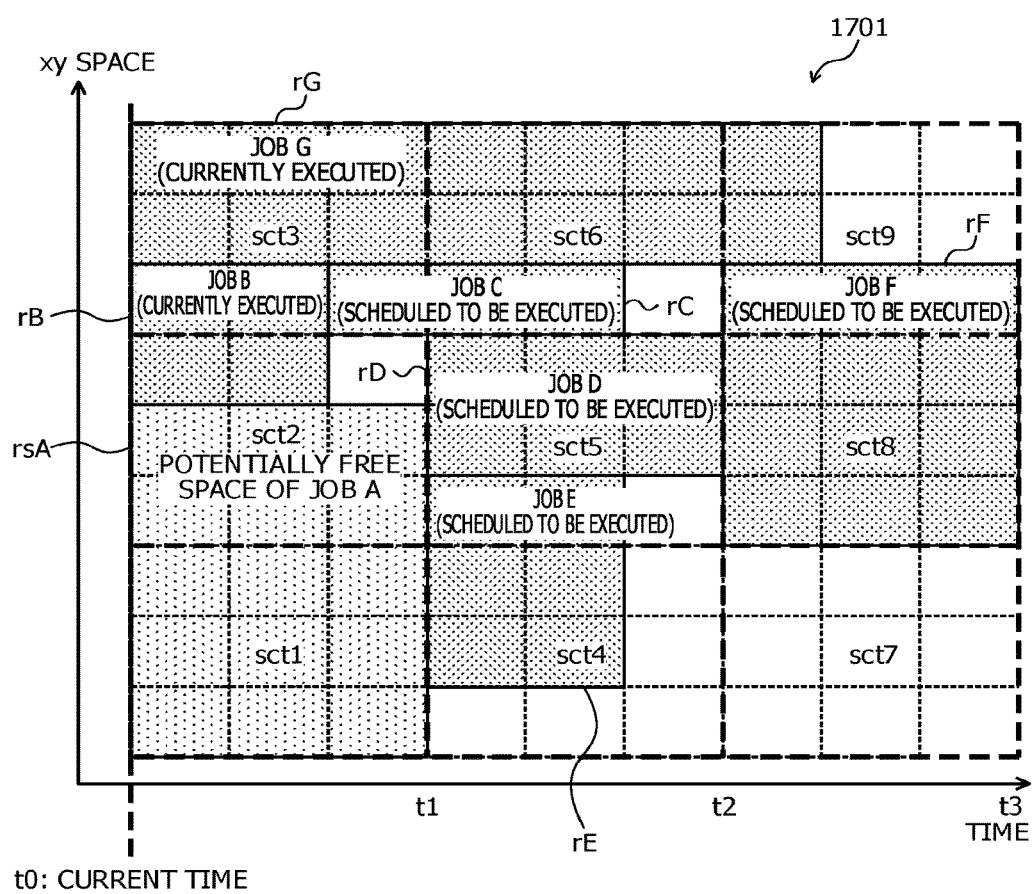
Figure 18:
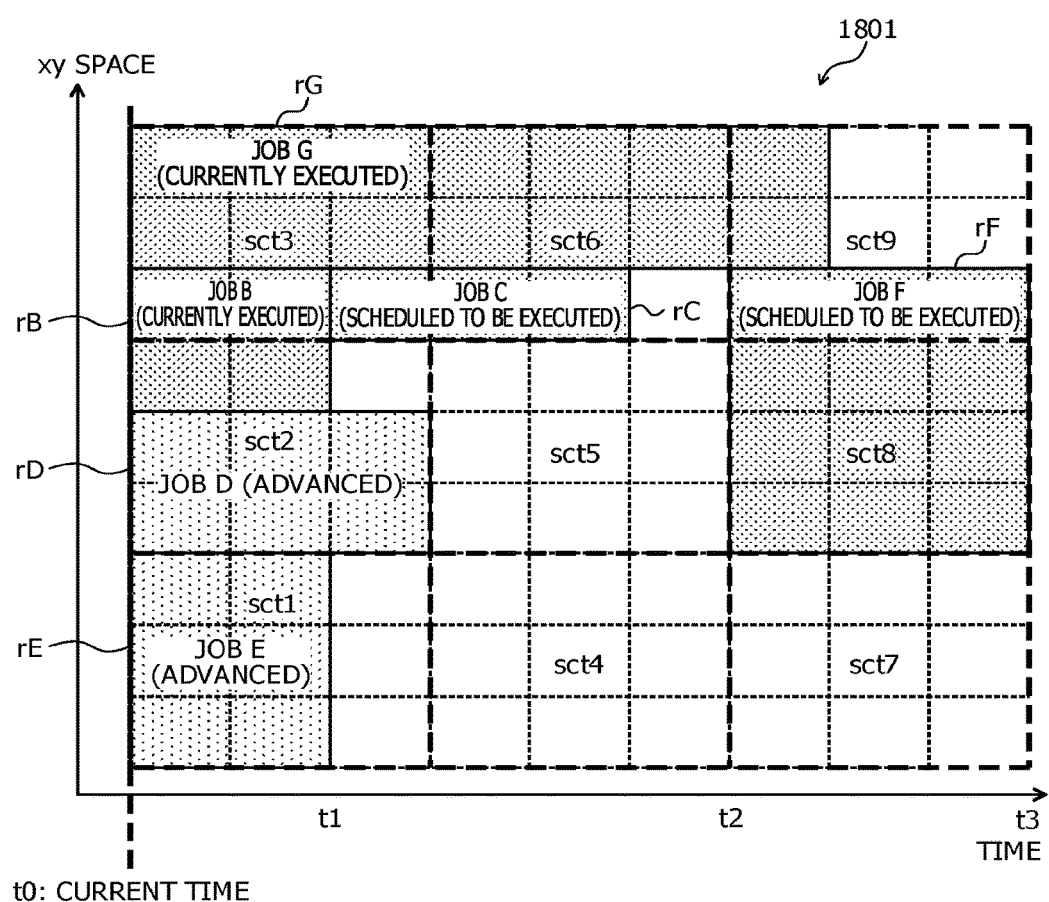

FIGS. 16, 17, and 18 illustrate an example of determining candidate-to-be-advanced jobs. A graph 1601 illustrated in FIG. 16 illustrates the used node areas rA to rF of the respective jobs A to F, as schedules of the respective jobs A to F. In addition, it is assumed that "t" is a time. In addition, "t0" is a current time. Jobs currently executed at the current time t0 are jobs A, B, and G. In addition, the jobs C, D, E, and F are jobs scheduled to be executed. In FIG. 16 to FIG. 18, in order to separate from divided sections, rA is lightly shaded, and rB to rG are heavily shaded.

A graph 1701 illustrated in FIG. 17 illustrates an example of dividing the graph 1601 into sections to serve as areas that are arranged at adequate intervals and that do not intersect with one another. In the graph 1701, the sections each correspond to a range enclosed by a thick dashed line. In an example of FIG. 17, a time width of each of the sections is a time width three times as large as a minimum allocated time period. Accordingly, in a time width of the time t0 to the time t1, three sections sct1 to sct3 of a lower portion, a middle portion, and an upper portion of the graph 1701 are formed. In the same way, three sections sct4 to sct6 of a lower portion, a middle portion, and an upper portion of the graph 1701 are formed in a time width of the time t1 to the time t2, and three sections sct7 to sct9 of a lower portion, a middle portion, and an upper portion of the graph 1701 are formed in a time width of the time t2 to a time t3. In addition, currently executed jobs and jobs the execution of which is to be reserved are each expressed by a rectangular parallelepiped of "a node area in an xy space, used by the relevant job,×a scheduled execution time period (t)".

Here, the job scheduler 410 associates one section with each of the jobs. The job scheduler 410 obtains a midpoint of a rectangular parallelepiped expressing a job and determines, as a section corresponding to the relevant job, a section to which the midpoint belongs, for example.

In addition, the job scheduler 410 holds, as the aligned job lists L aligned by the sizes of used node areas, each of job groups associated with the respective sections as pieces of management data of the respective sections. For this reason, the aligned job lists L for each of the sections turns out to be created. In the example of FIG. 17, the jobs C and G are held in the management data of the section sct6 of the graph 1701. In addition, in a case where, as a result of dividing so as to increase the size of each of the sections, the number of jobs able to be put thereinto becomes large, the aligned job lists L may be managed so as to be able to be searched for by using the hash tables H described in the first embodiment.

In the example of FIG. 17, it is assumed that the job A ends, and it is assumed that the size of a potentially free space rsA created by the job A is "s". In a case where the currently executed job A ends, the job scheduler 410 searches, within the jurisdiction of the section sct1 to which the job A has belonged, for a job the execution of which is reserved and that has a size less than or equal to the size of "s". Next, for each of the sections sct2, sct4, and sct5 adjacent to the section sct1 to which the job A has belonged, the job scheduler 410 searches for a job the execution of which is reserved and that has a size less than or equal to the size of "s". In this way, a job located within near distance of resources used by the job A is preferentially nominated as a candidate.

A graph 1801 illustrated in FIG. 18 illustrates a state of advancing the jobs D and E belonging to sections adjacent to the section sct1 to which the job A has belonged. In FIG. 18, the advanced jobs D and E are lightly shaded.

Here, in a case of advancing, with respect to the time t0, the jobs the execution of which is reserved, a free area of calculation nodes is generated at the time t1 in some cases, as illustrated in the graph 1801. By using the time t1 as a reference point, the job scheduler 410 may identify a potentially free space for an area to serve as a free area due to advancing the jobs D and E and may perform the same operation. For this reason, for a job the execution of which is scheduled to be started after the time t1, the job scheduler 410 is able to advance the job to the time t1. In the same way, the job scheduler 410 is able to repeat at the time t2 located in a boundary with subsequent sections.

Third Embodiment

In the first embodiment, the potentially free space based on ending of the job A is obtained by the management data held by the job scheduler 410. In a third embodiment, on calculation nodes executing a job, distances between nodes are obtained based on inter-node communication, thereby acquiring information for identifying a potentially free space. For this reason, processing performed by the job scheduler 410 is reduced. In addition, the third embodiment may be applied to the second embodiment.

Figure 19:
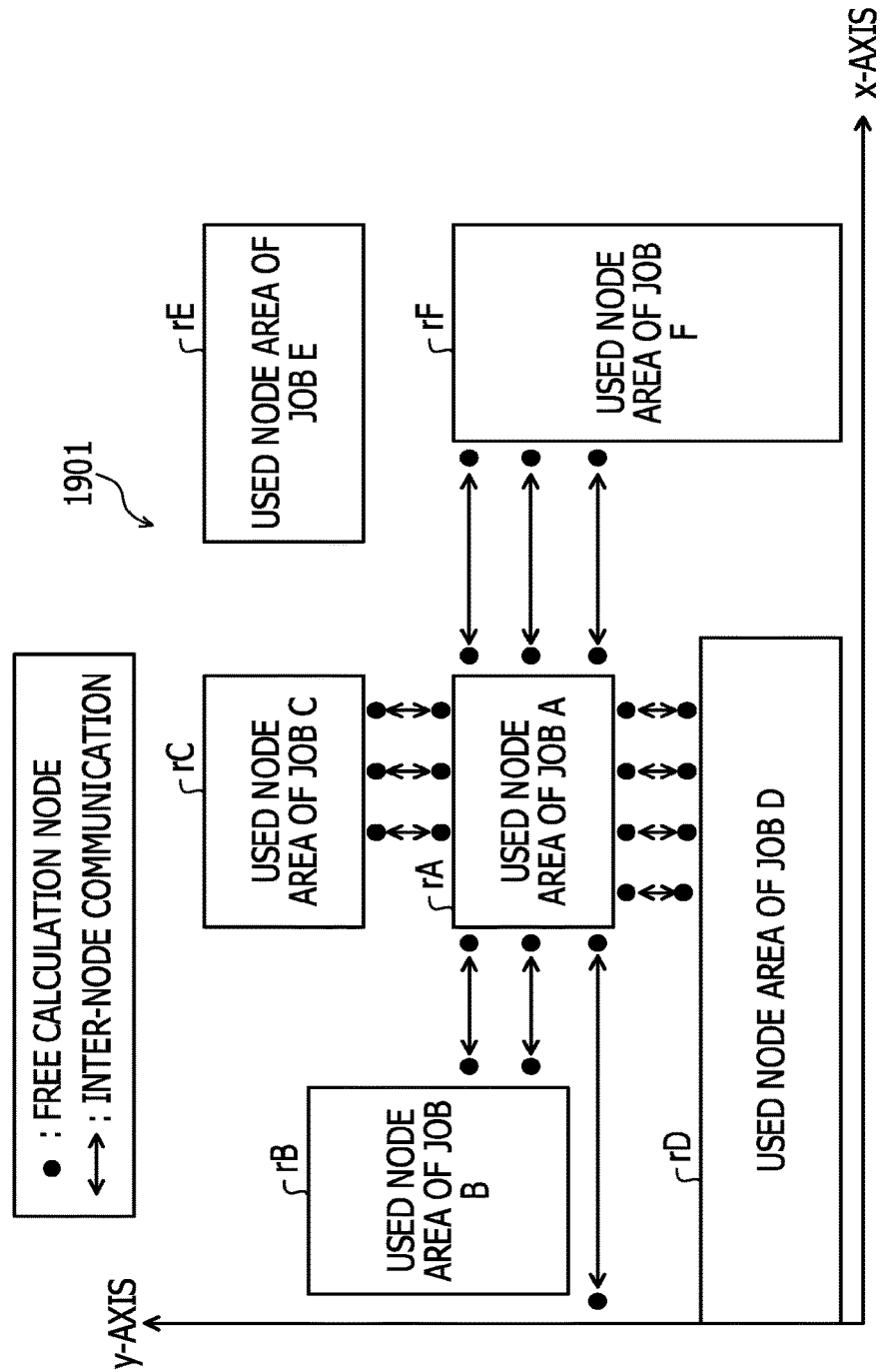
FIG. 19 illustrates an example of a method in which free nodes and a job management node identify a potentially free space in cooperation with each other.

FIG. 19 illustrates an example of a method in which free nodes and a job management node identify a potentially free space in cooperation with each other. At a time of requesting the calculation nodes cn to which execution is allocated to execute a job, the job scheduler 410 simultaneously provides, to free calculation nodes located immediately outside of a boundary surface of a used node area of the job, information informing of being the boundary surface. Hereinafter, a free calculation node to which the information informing of being the boundary surface is provided is called a "boundary surface node". The boundary surface node transmits a communication packet in an outward direction perpendicular to the boundary surface. Here, the outward direction perpendicular to the boundary surface is a direction parallel to the x-axis or a direction parallel to the y-axis.

A graph 1901 illustrated in FIG. 19 illustrates a pattern diagram of a state in which, on a schedule table managed by the job scheduler 410, each of boundary surface nodes obtains distances between nodes. Black circles illustrated by the graph 1901 each illustrate an example of transmitting packet communication to a free node serving as a boundary surface node.

Next, processing performed at a time of reserving, in other words, scheduling execution of the job A and processing performed thereafter at a time of starting of execution of the job A in the third embodiment will be described by using FIG. 20, FIG. 21, and FIG. 23 to FIG. 25 as flowcharts. Note that since processing performed at a time of ending of the execution of the job A in the third embodiment is the same as the processing performed at a time of ending execution of a job and illustrated in FIG. 15, the description thereof will be omitted.

Figure 20:
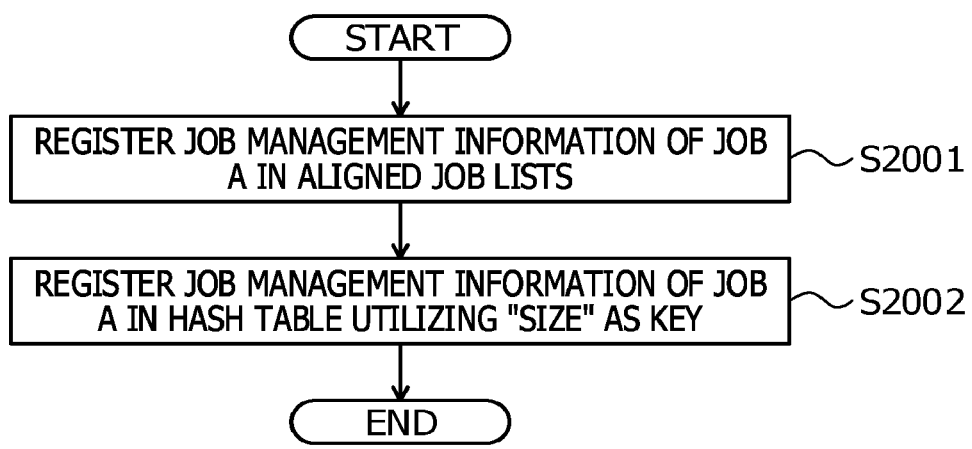
FIG. 20 is a flowchart illustrating an example of a processing procedure performed at a time of reserving execution of a job in a third embodiment.

FIG. 20 a flowchart illustrating an example of a processing procedure performed at a time of reserving execution of a job in the third embodiment.

The job scheduler 410 registers the job management information 420A of the job A in the aligned job lists L (step S2001). The aligned job lists L are illustrated in FIG. 8. As illustrated in FIG. 8, as the aligned job lists L, there are individual lists related to minimum coordinates, maximum coordinates, and sizes in respective dimensions. Here, a timing of performing the processing illustrated in FIG. 20 is after determination of scheduling of the job A, and minimum coordinates, maximum coordinates, and sizes in respective dimensions of an allocated area of the job A are understood. Therefore, it is possible to insert the information of the job A into the aligned job lists L.

Next, the job scheduler 410 registers, in the hash table Hsize utilizing a "size" as a key, the job management information of the job A (step S2002). The processing operation in step S2002 is the same as the processing operation in step S1402. After the processing operation in step S2002 finishes, the job scheduler 410 terminates the processing performed at a time of reserving execution of the job.

Figure 21:
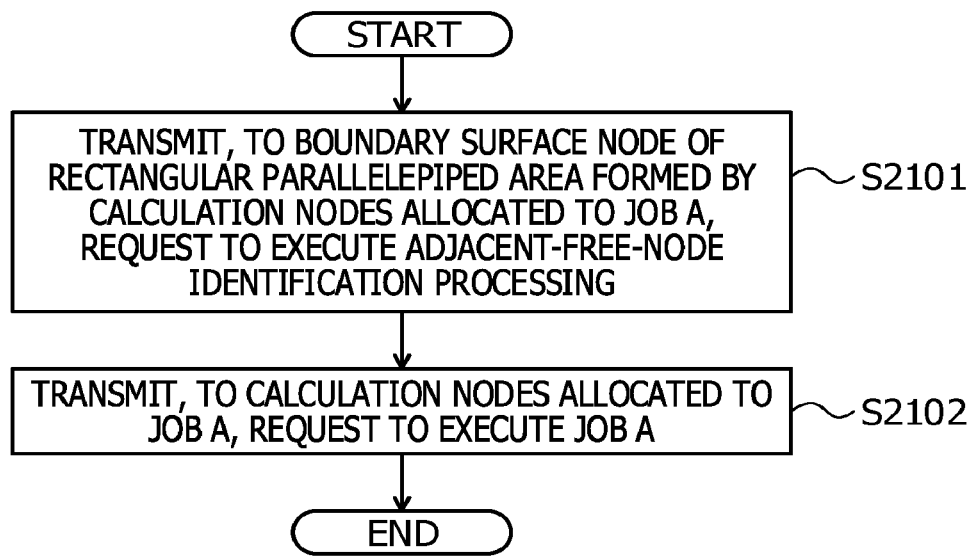
FIG. 21 is a flowchart illustrating an example of a processing procedure performed at a time of starting execution of a job.

FIG. 21 is a flowchart illustrating an example of a processing procedure performed at a time of starting execution of a job. Processing performed at a time of starting execution of a job is processing performed by the job scheduler 410 at a time of requesting the calculation nodes cn to start execution of the job.

The job scheduler 410 transmits, to a boundary surface node of a rectangular parallelepiped area formed by calculation nodes allocated to the job A, a request to execute adjacent-free-node identification processing (step S2101). This execution request includes information indicating being a boundary surface of the job A, information indicating a coordinate axis perpendicular to the boundary surface, and information indicating a direction of heading outside. Furthermore, the execution request includes, as information of the job A, information of each of coordinates of an allocated node area.

Next, the job scheduler 410 transmits, to calculation nodes allocated to the job A, a request to execute the job A (step S2102). After the processing operation in step S2102 finishes, the job scheduler 410 terminates the processing performed at a time of starting execution of a job. Next, an example of information transmitted to a boundary surface node will be described by using FIG. 22.

Figure 22:
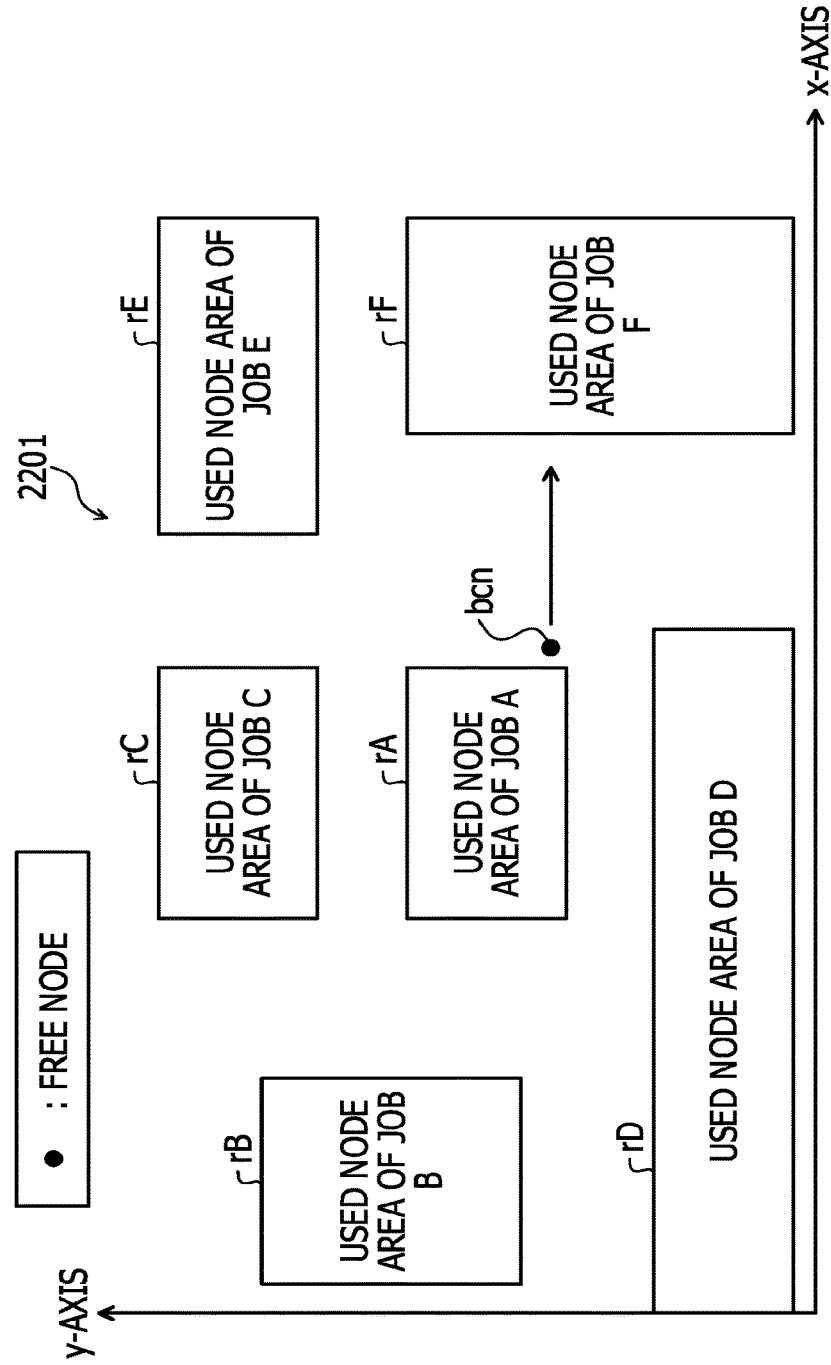
FIG. 22 illustrates an example of information transmitted to a boundary surface node.

FIG. 22 illustrates an example of information transmitted to a boundary surface node. A graph 2201 illustrated in FIG. 22 illustrates the used node areas rA to rF of the respective jobs A to F and a node bcn that is one node included in nodes to serve as boundary surface nodes at a time of staring execution of the job A.

In an example of FIG. 22, since a boundary surface extends in the y-axis direction, information that indicates a coordinate axis and that is provided to the node bcn is "x-axis", and the information indicating a direction of heading outside is a positive direction. In the following descriptions of FIG. 23 to FIG. 25, the boundary surface node bcn will be described as an example. Next, adjacent-free-node identification processing performed by the boundary surface node will be described by using FIG. 23.

Figure 23:
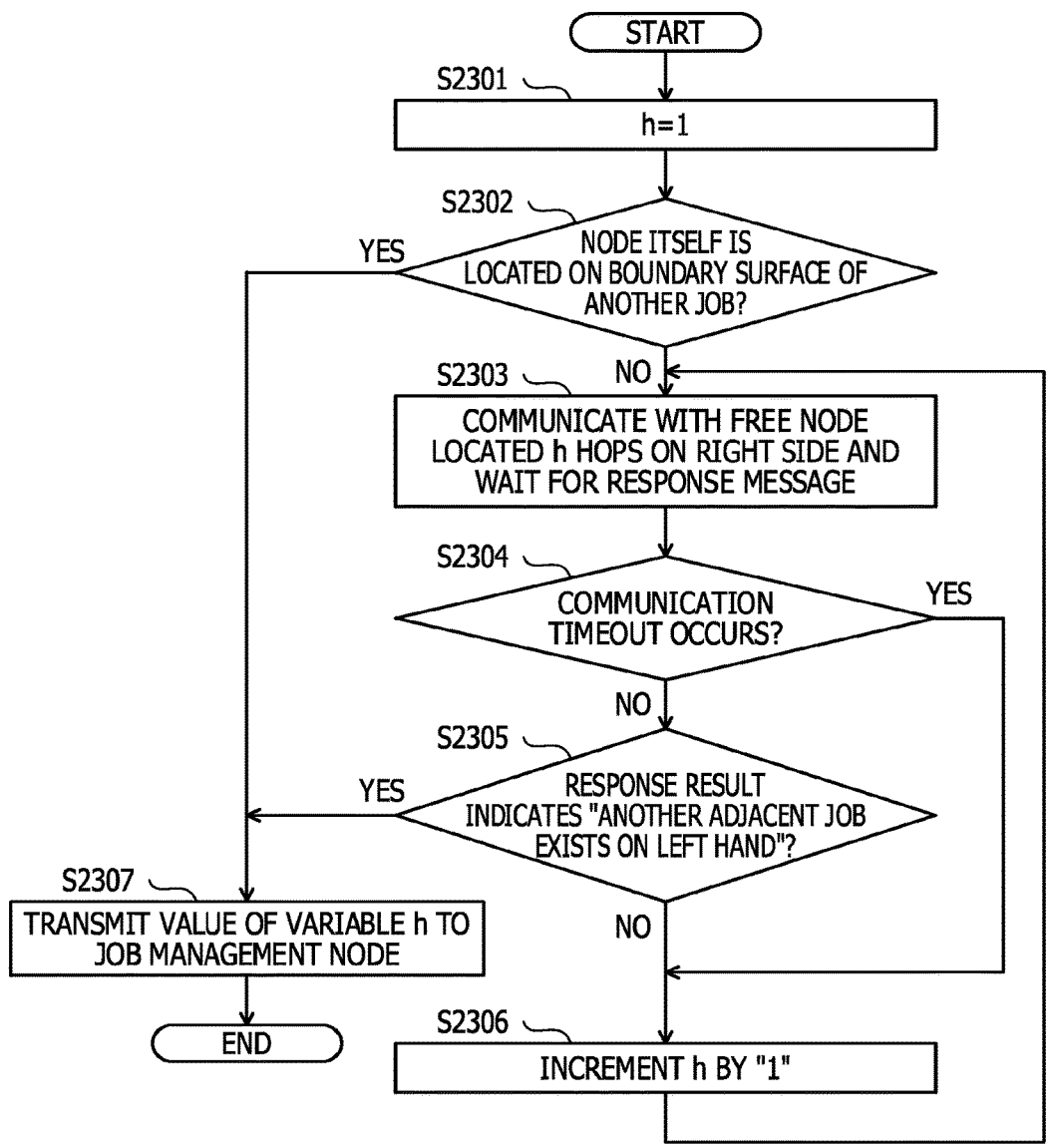
FIG. 23 is a flowchart illustrating an example of an adjacent-free-node identification processing procedure performed by the boundary surface node.

FIG. 23 is a flowchart illustrating an example of an adjacent-free-node identification processing procedure performed by the boundary surface node. Adjacent-free-node identification processing is performed in a case where a node serving as a boundary surface node receives an execution request. As for the adjacent-free-node identification processing illustrated in FIG. 23, since the boundary surface node bcn is adopted as an example, a coordinate axis perpendicular to the boundary surface is the "x-axis, and "direction" is the "positive direction". In the description of FIG. 23, in order to simplify an explanation, the positive direction is described as "right", and a negative direction is described as "left".

The boundary surface node bcn substitutes "1" into a variable h (step S2301). Here, the variable h is a variable indicating the number of hops corresponding to a distance from a node that is located on a right side and with which communication is to be performed.

Next, the boundary surface node bcn determines whether or not the node itself is located on a boundary surface of another job (step S2302). Here, the boundary surface node bcn is located on the right side of the job A. Accordingly, in a case where the node itself is located on a boundary surface of another job, adjacent allocated nodes of the other job exists on the right hand thereof. As for a method for determining whether or not another adjacent job exists on a right hand, the determination is performed based on it that, as illustrated in FIG. 21 and FIG. 22, at a time of requesting to execute the other job, a boundary surface node of the other job is notified of information indicating being a boundary surface by the job scheduler 410.

In a case where the node itself is not located on a boundary surface of another job (step S2302: No), the boundary surface node bcn communicates with a free node located h hops on a right side and waits for a response message (step S2303). Here, the boundary surface node bcn sets in advance a time regarded as a communication timeout. Processing performed at a time of receiving communication from the boundary surface node will be illustrated in FIG. 24.

Next, the boundary surface node bcn determines whether or not a communication timeout occurs (step S2304). In a case where no communication timeout occurs (step S2304: No), the boundary surface node bcn determines whether or not a response result indicates "another adjacent job exists on a left hand" (step S2305).

In a case where a communication timeout occurs (step S2304: Yes), or in a case where the response result does not indicate "another adjacent job exists on a left hand" (step S2305: No), the boundary surface node bcn increments the variable h by "1" (step S2306). In addition, the boundary surface node bcn makes a transition to the processing operation in step S2303.

On the other hand, in a case where the node itself is located on the boundary surface of the other job (step S2302: Yes), or in a case where the response result indicates "the other adjacent job exists on the left hand" (step S2305: Yes), the boundary surface node bcn transmits the value of the variable h to the job management node adn (step S2307). The value of the variable h indicates a distance to a used node of the other job in a right direction. After the processing operation in step S2307 finishes, the boundary surface node bcn terminates the adjacent-free-node identification processing.

While, in the processing operation in step S2307, each of nodes located on the boundary surface transmits the information of "h" to the job management node adn, there is no limitation to this. One of the boundary surface nodes may be defined as a representative surface node, and a representative node may collect the values of the variables h obtained from the respective boundary surface nodes and may transmit a minimum value of collected distances to the job management node adn, for example. For each of the boundary surfaces, the job scheduler 410 selects one of nodes as the representative node, for example. In addition, at a time of transmitting, to the boundary surface nodes including the representative node, a request to execute the adjacent-free-node identification processing, the job scheduler 410 transmits coordinates of the representative node along therewith. In the processing operation in step S2307, boundary surface nodes other than the representative node each transmit the information of the distance h not to the job management node adn but to the representative node. After completing collection of the values of the distances h from the respective boundary surface nodes, the representative node obtains a minimum value of distances and transmits the obtained minimum value to the job management node adn.

Figure 24:
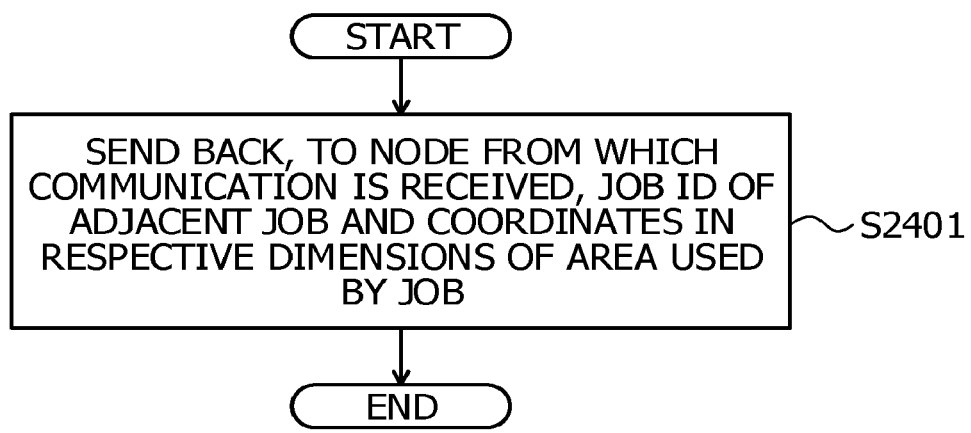
FIG. 24 is a flowchart illustrating an example of a processing procedure performed by a free calculation node.

FIG. 24 is a flowchart illustrating an example of a processing procedure performed by a free calculation node. Processing performed by the free calculation node and illustrated in FIG. 24 is processing performed at a time of receiving, based on the processing operation in step S2303, communication from the boundary surface node bcn.

The calculation node cn that receives communication from the boundary surface node bcn sends back, to the node from which the communication is received, a job ID of an adjacent job and coordinates in respective dimensions of an area used by the relevant job (step S2401). Note that, in a case where there is no adjacent job, the calculation node cn that receives communication from the boundary surface node bcn only has to transmit information indicating absence of an adjacent job. After the processing operation in step S2401 finishes, the calculation node cn that receives communication from the boundary surface node bcn terminates the processing.

Figure 25:
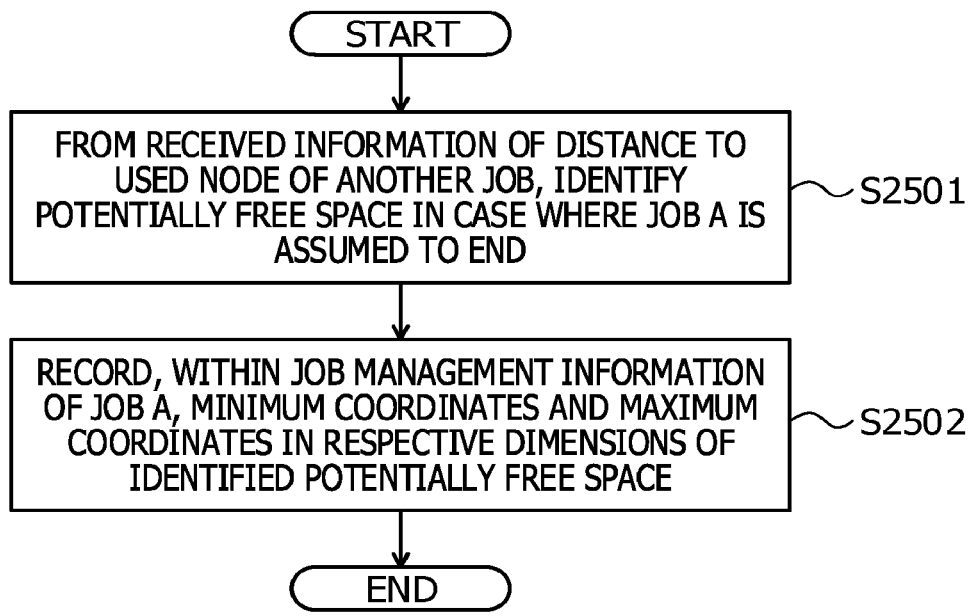
FIG. 25 is a flowchart illustrating an example of a processing procedure performed by the job management node.

FIG. 25 is a flowchart illustrating an example of a processing procedure performed by the job management node. Processing performed by the job management node and illustrated in FIG. 25 is processing performed by the job scheduler 410 at a time of receiving, based on the processing operation in step S2307, information of a distance to a used node of another job from the boundary surface node bcn or the representative node.

From the received information of a distance to a used node of the other job, the job scheduler 410 identifies a potentially free space in a case where the job A is assumed to end (step S2501). Next, the job scheduler 410 records, within the job management information 420 of the job A, minimum coordinates and maximum coordinates in respective dimensions of the identified potentially free space (step S2502). After the processing operation in step S2502 finishes, the job scheduler 410 terminates the processing performed by the job management node and illustrated in FIG. 25.

In this way, in the first embodiment, as for a potentially free space, by tracing the aligned job lists L, a distance to an adjacent job is acquired, thereby obtaining minimum coordinates, maximum coordinates, and sizes of the potentially free space. However, in the third embodiment, the boundary surface node bcn obtains minimum coordinates and maximum coordinates of the potentially free space. Accordingly, a load on the job scheduler 410 is reduced in the third embodiment.

In this way, in the third embodiment, each of free nodes performs processing by using only information related to a job using adjacent nodes, without using a control table related to the entire system. Therefore, even in a case where the size of the parallel processing system 200 is increased, an increase in a CPU processing time is suppressed. Here, since using free nodes, communication used for the adjacent-free-node identification processing does not interfere with communication of a currently executed job. In addition, a report of a minimum value between nodes is performed at high speed by using a reduction function of network hardware without using CPUs of calculation nodes.

As described above, the job scheduler 410 identifies a potentially free space of a job from aligned job lists created at a time of determining a schedule and determines a job to be put into the relevant space in a case where the former job ends early. For this reason, the job scheduler 410 is able to speed up determination of a job to be advanced, by preliminarily identifying a potentially free space. In addition, by using a CPU time less than that of usual free resource search processing, the job scheduler 410 identifies a size of a free resource to become available in a case where a job ends early. For this reason, the job scheduler 410 narrows down, at high speed, candidates for jobs, the execution start time of which is able to be advanced, and improves the effective usage rate of generated free resources, thereby enabling the job throughput of the parallel processing system 200 to be improved.

In addition, by using the hash table Hsize, the job scheduler 410 may determine jobs to serve as candidates to be advanced, from among jobs. For this reason, compared with the method for determining by using the aligned job lists Lxsize and Lysize illustrated in FIG. 1, the job scheduler 410 is able to determine, at high speed, jobs to serve as candidates to be advanced.

In addition, for each of sections into which the mesh network 201 is divided, the job scheduler 410 may create aligned job lists L, thereby narrowing down jobs to serve as candidates to be advanced, to jobs within a space located within near distance of a potentially free space. For this reason, by restricting a search range, the job scheduler 410 is able to determine, at higher speed, jobs to serve as candidates to be advanced.

In addition, the job scheduler 410 may cause the boundary surface node bcn to perform the adjacent-free-node identification processing. In this way, the job scheduler 410 distributes, to the boundary surface node bcn, a load on identification of a potentially free space, thereby enabling a load on the job scheduler 410 to be suppressed.

Note that a preliminarily prepared program is executed by a computer such as a personal computer or a workstation, thereby realizing the parallel processing method described in the present embodiment. The present parallel processing program is recorded in a computer-readable recording medium such as a hard disk, a flexible disk, a Compact Disc-Read Only Memory (CD-ROM), or a Digital Versatile Disk (DVD) and is read from the recording medium by the computer, thereby being executed. In addition, the present parallel processing program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel processing system comprising:
 a memory; and
 a processor coupled to the memory and configured to:
  create a list when determining an execution start time and an execution end time of each of a plurality of processings for a plurality of nodes in the parallel processing system and one or more of the plurality of nodes used by each of the plurality of processings, the list storing information indicating an order of executing each of the plurality of processings and a number and positions with regard to nodes used by each of the plurality of processings on each of a plurality of coordinate axes, the plurality of nodes each including a processor and a memory, nodes included in the plurality of nodes and adjacent to each other in each of coordinate axis directions on the each of the plurality of coordinate axes being coupled to each other,
  identify a number of unused nodes on each of the plurality of coordinate axes at a time when the execution of one of the plurality of processings ends before an execution end time of the one of the plurality of processings by referring to the list before execution of the one of the plurality of processings ends, and
  determine, based on the identified number of unused nodes on each of the plurality of coordinate axes and the list, a processing, an execution start time of which is to be advanced, from the plurality of processings at a time when the execution of the one of the plurality of processings ends before the execution end time of the one of the plurality of processings.

2. The parallel processing system according to claim 1, wherein the processor is configured to:
   store a hash value output by inputting, to a hash function, the number with regard to nodes used by each of the plurality of processings on each of a plurality of coordinate axes, when determining the execution start time and the execution end time of the each of the plurality of processings and nodes to be allocated to the each of the plurality of processings, wherein, in the hash function, an output value monotonically increases with an increase in an input value,
   calculate, when the execution of the one of the plurality of processings ends before the execution end time of the one of the plurality of processings, a hash value output by inputting, to the hash function, the number of unused nodes on each of the plurality of coordinate axes at a time when the execution of the one of the plurality of processings ends, and
   determine, based on a result of a comparison between the calculated hash value and the stored hash values, a processing an execution start time of which is to be advanced, from among the processings.

3. The parallel processing system according to claim 1, wherein the processor is configured to:
   classify, into one of a plurality of groups, the each of the plurality of processings, based on the order of executing the each of the plurality of processings and the positions with regard to nodes used by the each of the plurality of processings on each of the plurality of coordinate axes, when determining the execution start time and the execution end time of the each of the plurality of processings and nodes to be allocated to the each of the plurality of processings,
   create, for each of the plurality of groups, a list storing the information indicating the order of executing the each of the plurality of processings, which is classified to a corresponding one of the groups, and the number and positions of with regard to the nodes used by each of the plurality of processings on each of the plurality of coordinate axes,
   identify the number of unused nodes on each of the plurality of coordinate axes at a time when the execution of the one of the plurality of processings ends before the execution end time of the one of the plurality of processings by referring the created list related to a corresponding one of the plurality of groups to which the one of the plurality of processings belongs, before the execution of the one of the plurality of processings ends, and
   determine, based on the identified number of unused nodes on each of the coordinate axes and the list related to the corresponding one of the plurality of groups to which the one of the plurality of processings belongs, a processing, an execution start time of which is to be advanced, from processings belonging to the corresponding one of the plurality of groups to which the one of the plurality of processings belongs, at a time when the execution of the one of the plurality of processings ends before the execution end time of the one of the plurality of processings.

4. The parallel processing system according to claim 1, wherein the processor is configured to:
   transmit, to nodes which are adjacent to respective nodes used by the one of the plurality of processings on respective coordinate axes and which are unused by the one of the plurality of processings, a request to execute processing for notifying a processing request source of a number of nodes unused by none of the plurality of processings in each of directions perpendicular to respective coordinate axes, by referring the created list when starting execution of the one of the plurality of processings, and
   identify, based on the number of nodes unused by none of the plurality of processings notified by a node unused by the one of the plurality of processings, a number of unused nodes on each of the plurality of coordinate axes at a time when the execution of the one of the plurality of processings ends before the execution end time of the one of the plurality of processings.

5. The parallel processing system according to claim 1, wherein
   the plurality of nodes form a mesh-shaped network or torus-shaped network having the plurality of coordinate axes.

6. A method executed by a parallel processing system including a plurality of nodes, the plurality of nodes each including a processor and a memory, the method comprising:
   creating a list when determining an execution start time and an execution end time of each of a plurality of processings for the plurality of nodes and one or more of the plurality of nodes used by each of the plurality of processings, the list storing information indicating an order of executing each of the plurality of processings and a number and positions with regard to nodes used by each of the plurality of processings on each of a plurality of coordinate axes, nodes included in the plurality of nodes and adjacent to each other in each of coordinate axis directions on the each of the plurality of coordinate axes being coupled to each other;
   identifying a number of unused nodes on each of the plurality of coordinate axes at a time when the execution of one of the plurality of processings ends before an execution end time of the one of the plurality of processings by referring to the list before execution of the one of the plurality of processings ends; and
   determining, based on the identified number of unused nodes on each of the plurality of coordinate axes and the list, a processing, an execution start time of which is to be advanced, from the plurality of processings at a time when the execution of the one of the plurality of processings ends before the execution end time of the one of the plurality of processings.

7. The method according to claim 6, further comprising:
   storing a hash value output by inputting, to a hash function, the number with regard to nodes used by each of the plurality of processings on each of a plurality of coordinate axes, when determining the execution start time and the execution end time of the each of the plurality of processings and nodes to be allocated to the each of the plurality of processings, wherein, in the hash function, an output value monotonically increases with an increase in an input value;
   calculating, when the execution of the one of the plurality of processings ends before the execution end time of the one of the plurality of processings, a hash value output by inputting, to the hash function, the number of unused nodes on each of the plurality of coordinate axes at a time when the execution of the one of the plurality of processings ends; and determining, based on a result of a comparison between the calculated hash value and the stored hash values, a processing an execution start time of which is to be advanced, from among the processings.

8. The method according to claim 6, further comprising:

classifying, into one of a plurality of groups, the each of the plurality of processings, based on the order of executing the each of the plurality of processings and the positions with regard to nodes used by the each of the plurality of processings on each of the plurality of coordinate axes, when determining the execution start time and the execution end time of the each of the plurality of processings and nodes to be allocated to the each of the plurality of processings;

creating, for each of the plurality of groups, a list storing the information indicating the order of executing the each of the plurality of processings, which is classified to a corresponding one of the groups, and the number and positions of with regard to the nodes used by each of the plurality of processings on each of the plurality of coordinate axes;

identifying the number of unused nodes on each of the plurality of coordinate axes at a time when the execution of the one of the plurality of processings ends before the execution end time of the one of the plurality of processings by referring the created list related to a corresponding one of the plurality of groups to which the one of the plurality of processings belongs, before the execution of the one of the plurality of processings ends; and determining, based on the identified number of unused nodes on each of the coordinate axes and the list related to the corresponding one of the plurality of groups to which the one of the plurality of processings belongs, a processing, an execution start time of which is to be advanced, from processings belonging to the corresponding one of the plurality of groups to which the one of the plurality of processings belongs, at a time when the execution of the one of the plurality of processings ends before the execution end time of the one of the plurality of processings.

9. The method according to claim 6, further comprising:

transmitting, to nodes which are adjacent to respective nodes used by the one of the plurality of processings on respective coordinate axes and which are unused by the one of the plurality of processings, a request to execute processing for notifying a processing request source of a number of nodes unused by none of the plurality of processings in each of directions perpendicular to respective coordinate axes, by referring the created list when starting execution of the one of the plurality of processings; and identifying, based on the number of nodes unused by none of the plurality of processings notified by a node unused by the one of the plurality of processings, a number of unused nodes on each of the plurality of coordinate axes at a time when the execution of the one of the plurality of processings ends before the execution end time of the one of the plurality of processings.

10. The method according to claim 6, wherein the plurality of nodes form a mesh-shaped network or torus-shaped network having the plurality of coordinate axes.

11. A non-transitory storage medium storing a program that causes a computer included in a parallel processing system including a plurality of nodes to execute a process, the plurality of nodes each including a processor and a memory, the process comprising:

creating a list when determining an execution start time and an execution end time of each of a plurality of processings for the plurality of nodes and one or more of the plurality of nodes used by each of the plurality of processings, the list storing information indicating an order of executing each of the plurality of processings and a number and positions with regard to nodes used by each of the plurality of processings on each of a plurality of coordinate axes, nodes included in the plurality of nodes and adjacent to each other in each of coordinate axis directions on the each of the plurality of coordinate axes being coupled to each other;

identifying a number of unused nodes on each of the plurality of coordinate axes at a time when the execution of one of the plurality of processings ends before an execution end time of the one of the plurality of processings by referring to the list before execution of the one of the plurality of processings ends; and determining, based on the identified number of unused nodes on each of the plurality of coordinate axes and the list, a processing, an execution start time of which is to be advanced, from the plurality of processings at a time when the execution of the one of the plurality of processings ends before the execution end time of the one of the plurality of processings.

12. The storage medium according to claim 11, wherein the process further comprises:

storing a hash value output by inputting, to a hash function, the number with regard to nodes used by each of the plurality of processings on each of a plurality of coordinate axes, when determining the execution start time and the execution end time of the each of the plurality of processings and nodes to be allocated to the each of the plurality of processings, wherein, in the hash function, an output value monotonically increases with an increase in an input value;

calculating, when the execution of the one of the plurality of processings ends before the execution end time of the one of the plurality of processings, a hash value output by inputting, to the hash function, the number of unused nodes on each of the plurality of coordinate axes at a time when the execution of the one of the plurality of processings ends; and determining, based on a result of a comparison between the calculated hash value and the stored hash values, a processing an execution start time of which is to be advanced, from among the processings.

13. The storage medium according to claim 11, wherein the process further comprises:

classifying, into one of a plurality of groups, the each of the plurality of processings, based on the order of executing the each of the plurality of processings and the positions with regard to nodes used by the each of the plurality of processings on each of the plurality of coordinate axes, when determining the execution start time and the execution end time of the each of the plurality of processings and nodes to be allocated to the each of the plurality of processings;

creating, for each of the plurality of groups, a list storing the information indicating the order of executing the each of the plurality of processings, which is classified to a corresponding one of the groups, and the number and positions of with regard to the nodes used by each of the plurality of processings on each of the plurality of coordinate axes;

identifying the number of unused nodes on each of the plurality of coordinate axes at a time when the execution of the one of the plurality of processings ends before the execution end time of the one of the plurality of processings by referring the created list related to a corresponding one of the plurality of groups to which the one of the plurality of processings belongs, before the execution of the one of the plurality of processings ends; and determining, based on the identified number of unused nodes on each of the coordinate axes and the list related to the corresponding one of the plurality of groups to which the one of the plurality of processings belongs, a processing, an execution start time of which is to be advanced, from processings belonging to the corresponding one of the plurality of groups to which the one of the plurality of processings belongs, at a time when the execution of the one of the plurality of processings ends before the execution end time of the one of the plurality of processings.

14. The storage medium according to claim 11, wherein the process further comprises:

transmitting, to nodes which are adjacent to respective nodes used by the one of the plurality of processings on respective coordinate axes and which are unused by the one of the plurality of processings, a request to execute processing for notifying a processing request source of a number of nodes unused by none of the plurality of processings in each of directions perpendicular to respective coordinate axes, by referring the created list when starting execution of the one of the plurality of processings; and identifying, based on the number of nodes unused by none of the plurality of processings notified by a node unused by the one of the plurality of processings, a number of unused nodes on each of the plurality of coordinate axes at a time when the execution of the one of the plurality of processings ends before the execution end time of the one of the plurality of processings.

15. The storage medium according to claim 11, wherein the plurality of nodes form a mesh-shaped network or torus-shaped network having the plurality of coordinate axes.

* * * * *